United States Patent
Konoura et al.

(10) Patent No.: US 11,010,269 B2
(45) Date of Patent: May 18, 2021

(54) DISTRIBUTED PROCESSING SYSTEM AND METHOD FOR MANAGEMENT OF DISTRIBUTED PROCESSING SYSTEM

(71) Applicant: HITACHI, LTD., Tokyo (JP)

(72) Inventors: Hiroaki Konoura, Tokyo (JP); Masafumi Kinoshita, Tokyo (JP); Nobuyuki Chaki, Tokyo (JP)

(73) Assignee: HITACHI, LTD., Tokyo (JP)

(*) Notice: Subject to any disclaimer, the term of this patent is extended or adjusted under 35 U.S.C. 154(b) by 27 days.

(21) Appl. No.: 16/494,601

(22) PCT Filed: May 29, 2018

(86) PCT No.: PCT/JP2018/020582
§ 371 (c)(1),
(2) Date: Sep. 16, 2019

(87) PCT Pub. No.: WO2018/230332
PCT Pub. Date: Dec. 20, 2018

(65) Prior Publication Data
US 2020/0089585 A1   Mar. 19, 2020

(30) Foreign Application Priority Data
Jun. 15, 2017 (JP) .............................. JP2017-117659

(51) Int. Cl.
*G06F 11/30* (2006.01)
*G06F 11/14* (2006.01)

(52) U.S. Cl.
CPC ...... *G06F 11/3006* (2013.01); *G06F 11/1425* (2013.01)

(58) Field of Classification Search
CPC .............. G06F 11/0793; G06F 11/142; G06F 11/1425; G06F 11/1428; G06F 11/143;
(Continued)

(56) References Cited

U.S. PATENT DOCUMENTS 4,805,107 A * 2/1989 Kieckhafer ........... G06F 9/4881
714/15
6,108,699 A * 8/2000 Moiin ................. G06F 11/1425
709/201
(Continued)

FOREIGN PATENT DOCUMENTS

JP 2005-055995 A 3/2005
JP 2005-088170 A 4/2005
(Continued)

OTHER PUBLICATIONS

International Search Report for PCT/JP2018/020582, dated Sep. 4, 2018.
(Continued)

*Primary Examiner* — Gabriel Chu
(74) *Attorney, Agent, or Firm* — Volpe Koenig

(57) ABSTRACT

A distributed processing system includes a plurality of information processing apparatuses communicably coupled to one another and is capable of performing parallel processing in which the information processing apparatus performs predetermined processing in parallel with the other information processing apparatuses. The distributed processing system including a configuration-information storing part that stores configuration information concerning the number of the information processing apparatuses configuring the distributed processing system and a combination of the information processing apparatuses, a state monitoring part that monitors an operation state of each of the information processing apparatuses, and a system reconfiguring part that, when detecting a change of the operation state of the information processing apparatus, changes the configuration information based on the number and combination of information processing apparatuses in operation and causes, based on the changed configuration information, at least one
(Continued)

or more of the information processing apparatuses to perform the predetermined processing.

14 Claims, 13 Drawing Sheets

(58) Field of Classification Search
CPC .... G06F 11/20; G06F 11/202; G06F 11/2023; G06F 11/2025; G06F 11/028; G06F 11/2028; G06F 11/3051; G06F 9/38; G06F 9/3861; G06F 9/3885; G06F 9/5061; G06F 9/5066
See application file for complete search history.

(56) References Cited

U.S. PATENT DOCUMENTS

| | | | | |
|---|---|---|---|---|
| 6,615,366 | B1* | 9/2003 | Grochowski | G06F 9/30076 712/1 |
| 2001/0056554 | A1* | 12/2001 | Chrabaszcz | G06F 11/2023 714/13 |
| 2002/0078263 | A1* | 6/2002 | Darling | G06F 9/5061 719/331 |
| 2002/0078312 | A1* | 6/2002 | Wang-Knop | G06F 11/1425 711/150 |
| 2002/0161889 | A1* | 10/2002 | Gamache | G06F 11/2035 709/226 |
| 2013/0339805 | A1* | 12/2013 | Aho | G06F 11/3006 714/48 |
| 2014/0281663 | A1* | 9/2014 | Kohnke | G06F 11/2028 714/3 |
| 2015/0227442 | A1* | 8/2015 | Baddourah | G06F 11/2007 714/4.2 |
| 2016/0299789 | A1* | 10/2016 | Mutoh | G06F 9/5066 |

FOREIGN PATENT DOCUMENTS

| | | |
|---|---|---|
| JP | 2007-265013 A | 10/2007 |
| JP | 2009-217434 A | 9/2009 |
| JP | 2011-039740 A | 2/2011 |
| JP | 2011-159222 A | 8/2011 |

OTHER PUBLICATIONS

Japanese Office Action dated Jan. 26, 2021 for Japanese Patent Application No. 2017-117659.

* cited by examiner

CASE 1: IN CASE OF CONFIGURATION OF THREE SERVERS AND MULTIPLICITY OF 2
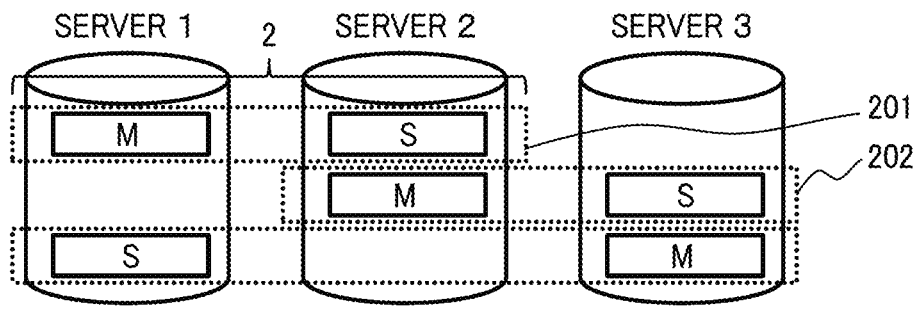
CASE 2: IN CASE OF CONFIGURATION OF THREE SERVERS AND MULTIPLICITY OF 3
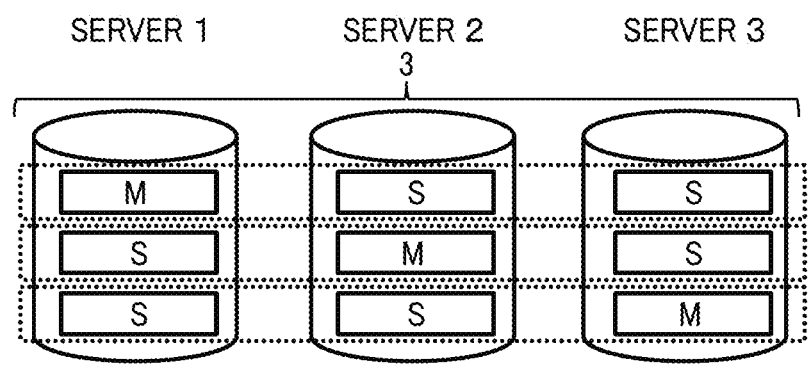
CASE 3: IN CASE OF CONFIGURATION OF N SERVERS AND MULTIPLICITY M
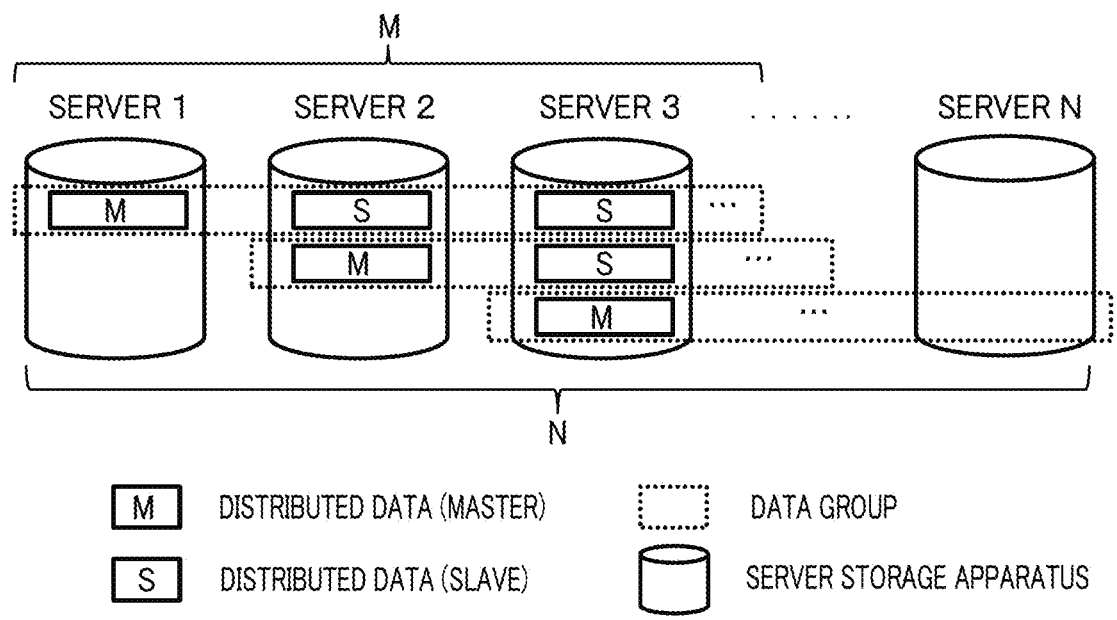
EXPLANATORY DIAGRAM OF DATA MULTIPLICITY
FIG. 2

EXAMPLE OF MULTIPLICITY DEFINITION INFORMATION
(SYSTEM CONFIGURATION INFORMATION)

EXAMPLE OF DISTRIBUTED APPLICATION/DISTRIBUTED DATA STORE PROGRAM COMMUNICATION DESTINATION INFORMATION

EXAMPLE OF DISTRIBUTED DATA STORE CONFIGURATION INFORMATION

EXAMPLE OF STATE TRANSITION PROCESSING DEFINITION INFORMATION
(CASE 1 (CONFIGURATION OF THREE SERVERS AND MULTIPLICITY OF 3))
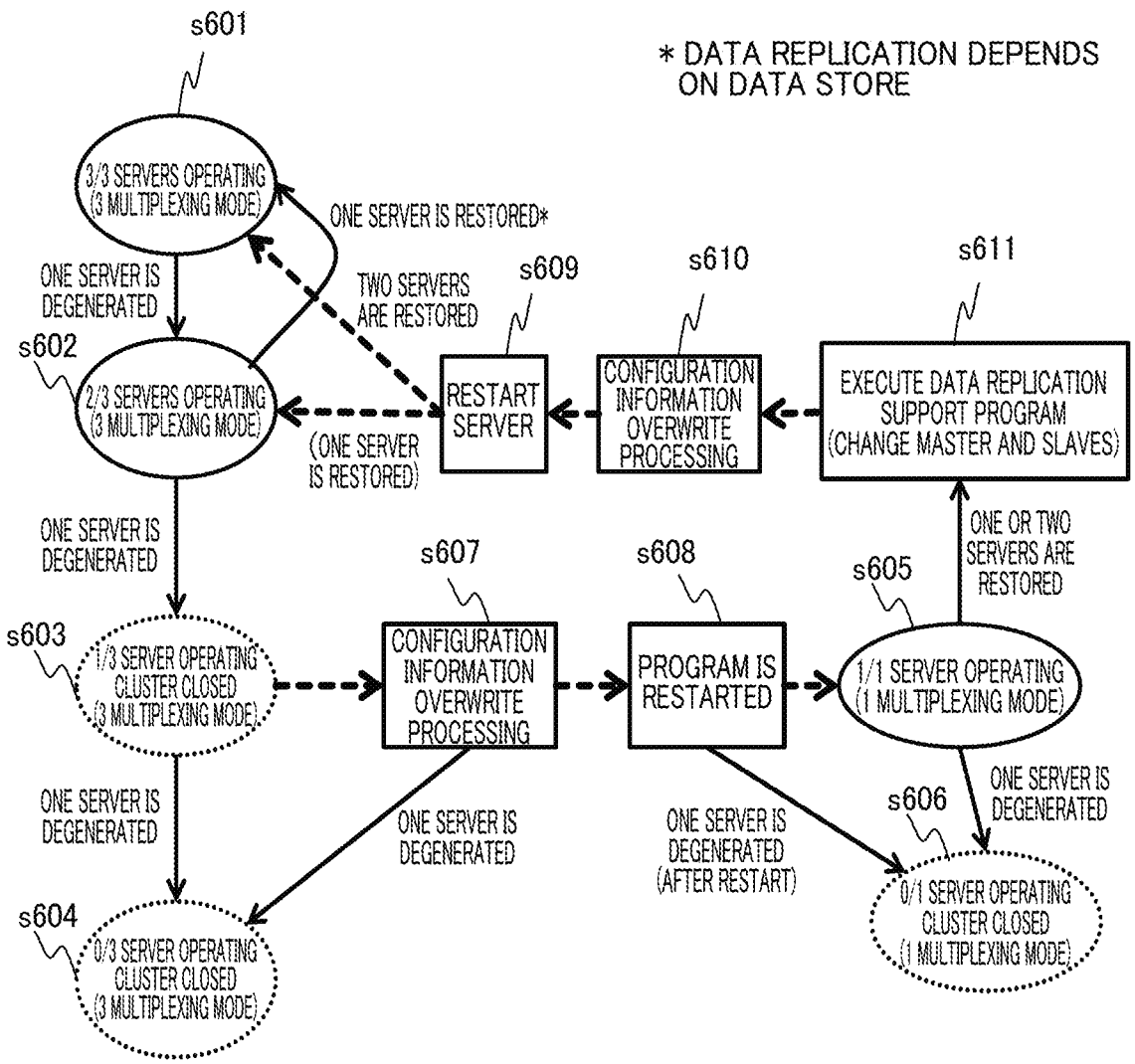
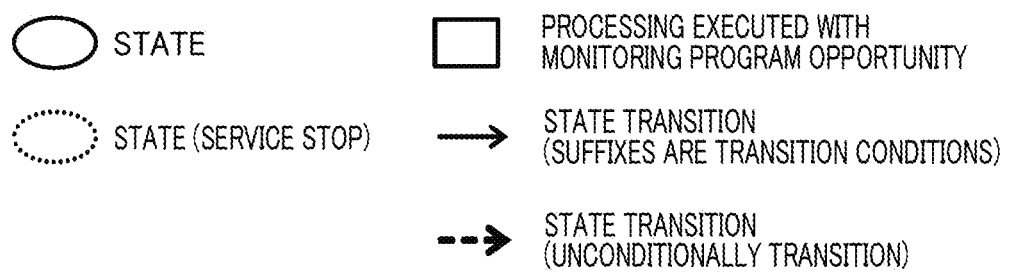
FIG. 11

EXAMPLE OF STATE TRANSITION PROCESSING DEFINITION INFORMATION
(TEXT DESCRIPTION EXAMPLE)

225

```
# cstate, trigger1, nstate1, action1, trigger2, nstate2, action2, ···
# string, int, string, int[ ], string, int, string, int[ ], ···

6211           6212              6213           6214
"3alive-3redundant", TRIG_1DEAD, "2alive-3redundant", {0}
"2alive-3redundant", TRIG_2DEAD, "1alive-cluster-close", {0}, ¥
              TRIG_2ALIVE, "3alive-3redundant", {0}
"1alive-3redundant", 0, "1alive-1redundant", {ACT_UPDATE_CFG, ACT_REBOOT}
"1alive-1redundant", TRIG_2ALIVE, "2alive-3redundant", ¥
              {ACT_UPDATE_CFG, ACT_REBOOT} ¥
              TRIG_3ALIVE, "3alive-3redundant", ¥
              {ACT_UPDATE_CFG, ACT_REBOOT}
                     :
                     :
```

DISTRIBUTED PROCESSING SYSTEM AND METHOD FOR MANAGEMENT OF DISTRIBUTED PROCESSING SYSTEM

TECHNICAL FIELD

The present invention relates to a distributed processing system and a method for management of a distributed processing system.

BACKGROUND ART

Cross-Reference to Related Application

The present application is based upon and claims priority from Japanese Patent Application No. 2017-117659 filed on Jun. 15, 2017, the content of which is hereby incorporated by reference in its entirety.

As one of operation forms of a distributed system by a plurality of information processing apparatuses (servers and the like), there has been proposed a distributed processing system having a configuration of a so-called ACT/STB type (ACTive/STand-By type) (hereinafter referred to as ACT/STB configuration) in which information processing apparatuses of an operation system and a standby system are provided and, when a failure occurs in the information processing apparatus of the operation system, the information processing apparatus of the standby system takes over processing of the information processing apparatus of the operation system and continues the processing to thereby secure redundancy.

For example, Patent Literature 1 states that, concerning a control method by two host computers (host servers), when a failure occurs in one host server, the other host server takes over processing. Patent Literature 2 states that N operation-system servers and one standby-system server are prepared to make hard disks redundant and perform mirroring. Patent Literature 3 discloses a server system including a plurality of redundant configurations, each including one operation-system server and one standby-system server, and a management server 3 that manages the redundant configurations.

Patent Literature 4 discloses, as another mechanism for securing redundancy, a technology in which a server management system automatically shifts, based on information related to a service level, among a plurality of systems configured by virtual machines, a system having a risk of occurrence of SLA (an agreement concerning the quality of the service level) violation to a high availability environment to change redundancy.

CITATION LIST

Patent Literature

[PTL 1] Japanese Laid-open Patent Publication No. 2005-0088170
[PTL 2] Japanese Laid-open Patent Publication No. 2005-055995
[PTL 3] Japanese Laid-open Patent Publication No. 2011-159222
[PTL 4] Japanese Laid-open Patent Publication No. 2011-39740

SUMMARY OF INVENTION

Technical Problem

However, in the ACT/STB configuration such as those described in Patent Literatures 1 to 3, in general, there is a problem in that a downtime (for example, a work time required for a system change for switching) occurs during takeover (switching) of the processing from the operation system to the standby system. Therefore, there has been proposed a distributed processing system of a so-called ACT/ACT type (ACTive/ACTive type) (hereinafter referred to as ACT/ACT configuration) in which all information processing apparatuses are configured as operation-system information processing apparatuses to avoid the occurrence of the downtime.

However, this ACT/ACT configuration has a limitation concerning redundancy. For example, it is necessary to provide at least "2N+1" servers (a so-called majority rule algorithm) as measures against N-fold failures (N=1, 2, 3) in order to, for example, secure a redundancy degree in a certain distributed processing system and withstand multiple failures (guarantee consistency of processing). For example, at least five servers are necessary to acquire tolerance against a double failure (N=2). Three servers are necessary when it is necessary to acquire tolerance against a single failure.

In this way, a predetermined number or more information processing apparatuses have to be provided in the ACT/ACT configuration. There is a problem in that treatment concerning a redundancy degree is fixed. Therefore, introduction (experimental introduction or small start) of the distributed processing system of the ACT/ACT configuration has a large burden and is costly for an introducer (a customer).

In this regard, Patent Literature 4 states that a redundancy degree can be changed by changing a configuration according to an SLA but does not disclose a mechanism for guaranteeing the ACT/ACT configuration. It is not easy to achieve both of securing of the redundancy degree and flexible operation in the distributed processing system.

The present invention has been devised in view of such present circumstances, and an object of the present invention is to provide a distributed processing system and a method for management of a distributed processing system capable of performing stable operation while securing redundancy in the distributed processing system.

Solution to Problem

One of the present inventions for achieving the object is a distributed processing system that is configured to include a plurality of information processing apparatuses communicably coupled to one another and including processors and memories and is capable of performing parallel processing in which the information processing apparatus performs predetermined processing in parallel with the other information processing apparatuses, the distributed processing system including: a configuration-information storing part that stores configuration information, which is information concerning a number of the information processing apparatuses configuring the distributed processing system and a combination of the information processing apparatuses; a state monitoring part that monitors an operation state of each of the information processing apparatuses; and a system reconfiguring part that, when detecting a change of the operation state of the information processing apparatus, changes the configuration information on the basis of a number and a combination of the information processing apparatuses in operation and causes, on the basis of the changed configuration information, at least one or more of the information processing apparatuses in operation to perform the predetermined processing independently or in parallel.

Advantageous Effects of Invention

According to the present invention, it is possible to enable stable operation while securing redundancy in the distributed processing system.

BRIEF DESCRIPTION OF DRAWINGS

FIG. 2 is a diagram showing examples (a case 1, a case 2, and a case 3) of an ACT/ACT configuration in a distributed application system 109.

FIG. 11 is a flowchart for explaining an example of state transition processing definition information 224 in the case 1.

FIG. 12 is a diagram showing an example of a data structure of the state transition processing definition information 224 in the case 1.

DESCRIPTION OF EMBODIMENTS

Modes for carrying out the present invention are explained below with reference to the drawings.

«System Configuration»

Figure 1:
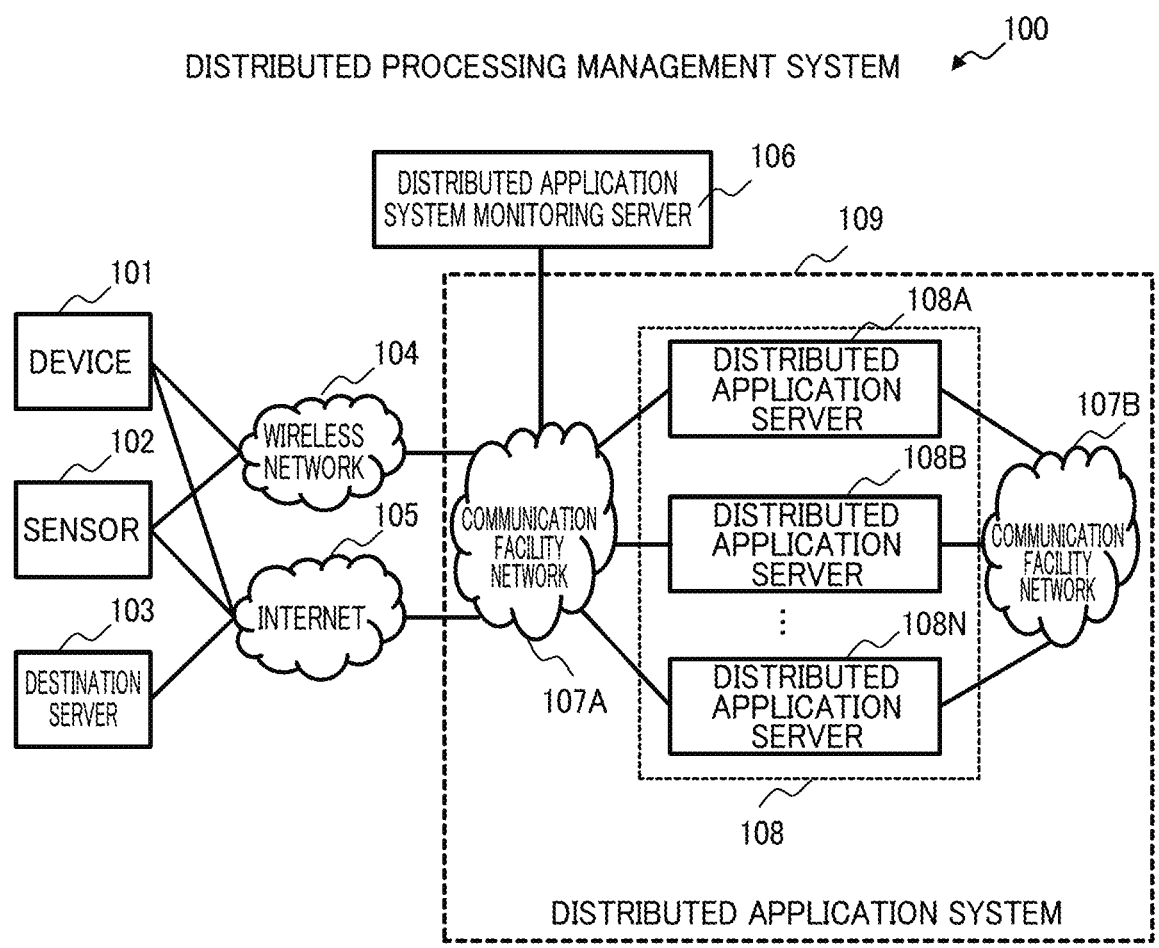
FIG. 1 is a diagram showing an example of the configuration of a distributed processing management system 100 according to an embodiment.

FIG. 1 is a diagram showing an example of the configuration of a distributed processing management system 100 according to an embodiment. As shown in the figure, the distributed processing management system 100 is configured to include apparatuses including a device 101, a sensor 102, and a destination server 103, a distributed application system 109 communicably coupled to these apparatuses, and a distributed application system monitoring server 106 communicably coupled to the distributed application system 109.

The device 101 is, for example, an information processing terminal (for example, a cellular phone, a smartphone, or a tablet) and performs predetermined information processing in cooperation with the distributed application system 109.

The sensor 102 is, for example, a temperature sensor, an illuminance sensor, or an acceleration sensor. For example, the sensor 102 acquires predetermined measurement values according to requests of distributed application servers 108 and transmits the acquired measurement value to the distributed application system 109.

The destination server 103 transmits data and programs of the distributed application system 109 to an external information processing apparatus or transfers data and programs transmitted from the external information processing apparatus to the distributed application system 109.

The distributed application system 109 includes a plurality of distributed application servers 108 (108A, 108B, . . . , and 108N) communicably coupled to one another by a communication facility network 107B.

The distributed application servers 108 respectively have stored therein a predetermined application program (hereinafter referred to as present application) used by users and the like (hereinafter simply referred to as users) of the distributed application servers 108 and predetermined data (hereinafter referred to as present data) associated with the distributed application servers 108.

The distributed application servers 108 are communicably coupled to the distributed application system monitoring server 106 via a communication facility network 107A. The distributed application servers 108 are communicably coupled to the device 101, the sensor 102, and the destination server 103 via a wireless network 104 or the Internet 105.

Note that the communication facility network 107A and the communication facility network 107B are, for example, a LAN (Local Area Network), a WAN (Wide Area Network), the Internet, an intranet, or an exclusive line. The wireless network 104 is, for example, a wireless LAN, a wireless WAN, or an exclusive wireless communication network.

The distributed application system monitoring server 106 is a server that monitors operation states of the distributed application servers 108.

The distributed application system monitoring server 106 has stored therein configuration information (not shown in the figure; details are explained below), which is information concerning the number and a combination of the distributed application servers 108 configuring the distributed application system 109. The distributed application system monitoring server 106 transmits an instruction concerning the configuration information (hereinafter referred to as reconfiguration notification) to the distributed application system 109. The distributed application servers 108 in the distributed application system 109 are capable of performing, on the basis of the reconfiguration notification, processing of the present application in parallel to the other distributed application servers 108 (that is, performing parallel processing; the same applies below).

That is, the distributed application system 109 is a distributed processing system of an ACT/ACT (ACTive/ACTive) configuration in which all information processing apparatuses configuring the distributed application system 109 are operation-system information processing apparatuses.

<ACT/ACT Configuration in the Distributed Application System 109>

The ACT/ACT configuration in the distributed application system 109 is specifically explained.

FIG. 2 is a diagram showing examples (a case 1, a case 2, and a case 3) of the ACT/ACT configuration in the distributed application system 109. In the distributed application system 109 in this embodiment, among N distributed application servers 108 configuring the distributed application system 109, M distributed application servers 108 stored in the configuration information perform parallel processing of the present application (multiplicity N). Even if a part of the distributed application servers 108 falls into an inoperable state, when more than half of the M distributed application servers 108 are operating, those distributed application servers 108 can perform the parallel processing of the present application with the ACT/ACT configuration (a so-called majority rule algorithm). Consequently, even if a part of the distributed application servers 108 configuring the distributed application system 109 falls into an inoperable state, the ACT/ACT configuration is maintained. When the distributed application server 108 not in operation starts operation, according to a predetermined program (an automatic replication program), the distributed application server 108 can execute the present application in parallel together with the other distributed application servers 108 again.

Note that the automatic replication program is stored by, for example, the distributed application servers 108.

In the case 1, the distributed application system 109 is configured from three distributed application servers 108 (a server 1, a server 2, and a server 3). Among the distributed application servers 108, two distributed application servers 108 in a predetermined combination indicated by the configuration information execute the processing of the present application in parallel. Specifically, this combination includes a combination in which the server 1 is a master and the server 2 is a slave, a combination in which the server 2 is a master and the server 3 is a slave, and a combination in which the server 3 is a master and the server 1 is a slave.

For example, in a state 201 in which the master server 1 and the slave server 2 are performing the parallel processing, when the server 1 stops operation, the state 201 transitions to a new state 202 in which one of the server 2 and the server 3 is a master or a slave. Consequently, the distributed application system 109 can continue the parallel processing.

Next, in the case 2, the distributed application system 109 is configured from the three distributed application servers 108 (the server 1, the server 2, and the server 3). The three distributed application servers 108 in a predetermined combination indicated by the configuration information execute the processing of the present application in parallel. Specifically, the combination includes a combination in which the server 1 is a master and the server 2 and the server 3 are slaves, a combination in which the server 2 is a master and the server 3 and the server 1 are slaves, and a combination in which the server 3 is a master and the server 1 and the server 2 are slaves.

In general, as shown in the case 3, the distributed application system 109 is configured from N distributed application servers 108 (the server 1, the server 2, . . . , a server N). Among the distributed application servers 108, M (N>M) distributed application servers 108 in a predetermined combination indicated by the configuration information execute the processing of the present application in parallel. Specifically, the combination includes a plurality of combinations in which any one server X is a master and M−1 servers other than the server X are slaves.

Note that, in this embodiment, it is assumed that information concerning the number of the distributed application servers 108 with which the distributed application servers 108 can perform the processing of the present application in parallel (hereinafter referred to as necessary number; in this embodiment, a value more than half of multiplicity) is stored in the distributed application system 109. In the following explanation, a group of the distributed application servers 108 that perform processing in parallel is referred to as data group.

Subsequently, the configuration of the distributed application system monitoring server 106 is explained.

<Configuration of the Distributed Application System Monitoring Server 106>

Figure 3:
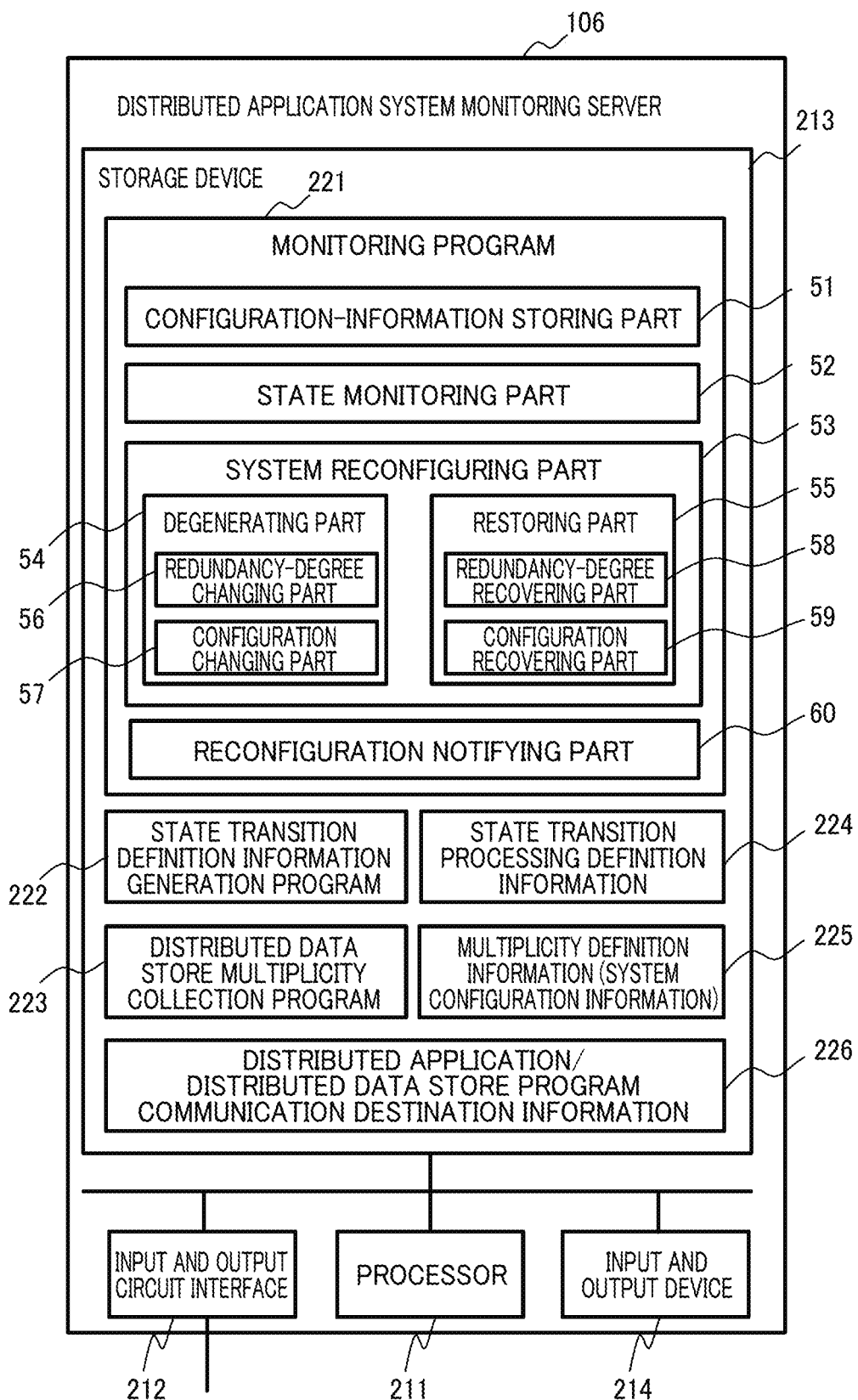
FIG. 3 is a diagram for explaining an example of hardware and functions included in a distributed application system monitoring server 106.

FIG. 3 is a diagram for explaining an example of hardware and functions included in the distributed application system monitoring server 106. The distributed application system monitoring server 106 includes a processor 211 such as a CPU (Central Processing Unit), an input and output circuit interface 212 that performs communication with the other information processing apparatuses, a storage device 213 such as a RAM (Random Access Memory), a ROM (Read Only Memory), a HDD (Hard Disk Drive), or an SSD (Solid State Drive), and an input and output device 214 including a keyboard, a mouse, a touch panel, and a monitor (a display).

The storage device 213 has stored therein programs including a monitoring program 221, a state transition processing definition information generation program 222, and a distributed data store multiplicity collection program 223. Respective kinds of information including state transition processing definition information 224, system configuration information 225, and distributed application/distributed data store program communication destination information 226 are stored in the distributed application server 108.

The monitoring program 221 includes parts including a configuration-information storing part 51, a state monitoring part 52, a system reconfiguring part 53, and a reconfiguration notifying part 60.

The configuration-information storing part 51 stores configuration information (system configuration information 225), which is information concerning the number of the information processing apparatuses (the distributed application servers 108) configuring the distributed processing system (the distributed application system 109) and a combination of the information processing apparatuses.

The state monitoring part 52 monitors an operation state of each of the information processing apparatuses (the distributed application servers 108).

Specifically, for example, the state monitoring part 52 monitors predetermined data transmitted by the distributed application server 108. When the data cannot be received in a predetermined time (hereinafter referred to as timeout time), the state monitoring part 52 determines that the distributed application server 108 is not in operation.

When detecting a change of an operation state of the information processing apparatus (the distributed application server 108), the system reconfiguring part 53 changes the configuration information on the basis of the number and a combination of the information processing apparatuses in operation and causes, on the basis of the changed configuration information, at least one or more of the information processing apparatuses in operation to perform the predetermined processing (the processing of the present application) independently or in parallel.

The system reconfiguring part 53 includes a degenerating part 54 and a restoring part 55.

The degenerating part 54 performs degeneration processing for, when detecting that apart of the information processing apparatuses in operation stops operating, changing the configuration information on the basis of the number and a combination of the information processing apparatuses in operation and causing, on the basis of the changed configuration information, the information processing apparatuses in operation to perform the predetermined processing independently or in parallel.

The degenerating part 54 includes a redundancy-degree changing Part 56 and a configuration changing part 57.

The redundancy-degree changing part 56 performs redundancy degree changing processing for, when detecting a state in which the information processing apparatuses less than the number indicated by the configuration information are operating because a part of the information processing apparatuses indicated by the configuration information stops operating, changing the number and the combination of the information processes apparatuses in the configuration information to a new number and a new combination of the information processing apparatuses in operation from which the information processing apparatus that stops operating is excluded and causing, on the basis of the changed configuration information, the information processing apparatuses in operation to perform the predetermined processing.

The configuration changing part 57 performs configuration changing processing for, when detecting a state in which a part of the information processing apparatuses indicated by the configuration information stops operating but a plurality of the information processing apparatuses equal to or more than the number indicated by the configuration information are still operating, changing the combination in the configuration information to a new combination of the information processing apparatuses from which the information processing apparatus that stops operating is excluded and causing, on the basis of the changed configuration information, the information processing apparatuses in operation to perform the predetermined processing in parallel.

On the other hand, the restoring part 55 performs restoration processing for, after the degeneration processing is executed, when detecting that the information processing apparatus not in operation starts operation, changing the configuration information on the basis of the number and a combination of the information processing apparatuses in operation and causing, on the basis of the changed configuration information, a plurality of the information processing apparatuses in operation to perform the predetermined processing in parallel.

The restoring part includes a redundancy-degree recovering part 58 and a configuration recovering part 59.

The redundancy-degree recovering part 58 performs redundancy-degree recovery processing for, after the redundancy-degree changing processing is executed, when detecting that the information processing apparatus not in operation starts operation, changing the number and the combination in the configuration information to a new number and a new combination of the information processing apparatuses including the information processing apparatus that starts operation and causing, on the basis of the changed configuration information, a plurality of the information processing apparatuses in operation to perform the predetermined processing in parallel.

The configuration recovering part 59 performs configuration recovery processing for, after the configuration changing processing is executed, when detecting that the information processing apparatus not in operation starts operation, changing the combination in the configuration information to a new combination of the information processing apparatuses including the information processing apparatus that starts operation and causing, on the basis of the changed configuration information, the information processing apparatuses in operation to perform the predetermined processing in parallel.

Note that the configuration information includes a combination of a master, which is the information processing apparatus that controls the predetermined processing performed in parallel, and slaves, which are the information processing apparatuses, processing of which is controlled by the master.

When the information processing apparatus that stops operating is the master, the configuration changing part 57 performs, on the configuration information, a change for setting any one of the slaves in operation as a new master to thereby cause the information processing apparatuses in operation to perform the predetermined processing in parallel.

The reconfiguration notifying part 60 outputs an indication that the system reconfiguring part 53 changed the configuration information or content of the chance.

Subsequently, the state transition processing definition information generation program 222 generates information defining operation states of the distributed application servers 108 and processing performed when the operation states change (state transition processing definition information 224).

The distributed data store multiplicity collection program 223 acquires information concerning a system configuration in the distributed application system 109 and stores the acquired information as the system configuration information 225 (configuration information).

An example of the system configuration information 225 is explained.

<System Configuration Information 225>

Figure 4:
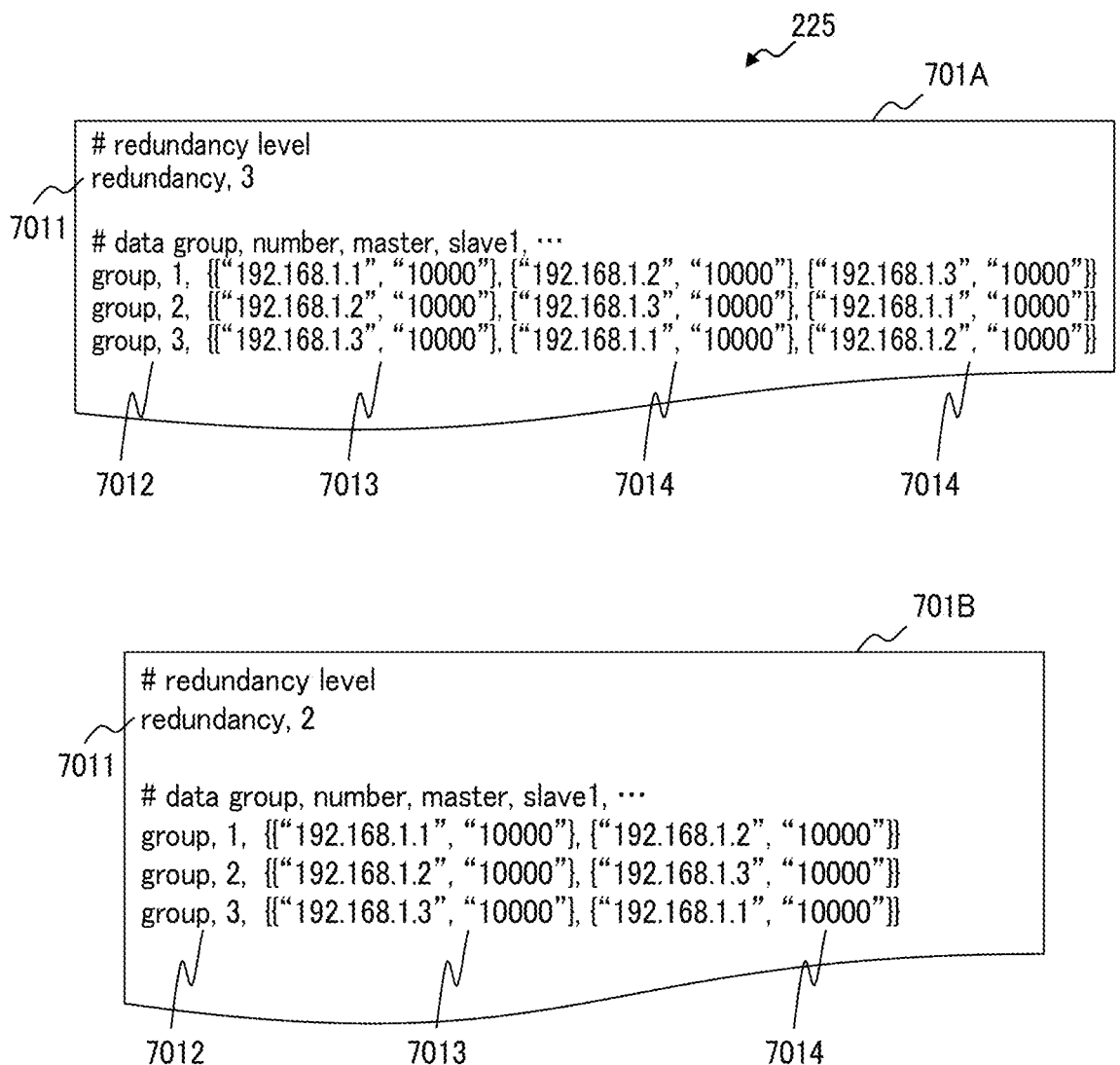
FIG. 4 is a diagram showing an example of system configuration information 225.

FIG. 4 is a diagram showing an example of the system configuration information 225. System configuration information 701A in the case 1 and system configuration information 701B in the case 2 are shown.

The system configuration information 225 includes information 7011 concerning multiplicity in the distributed application system 109, information 7012 for identifying data groups, information 7013 indicating a position on a network of a master in the data groups, and information 7014 indicating positions on the network of slaves in the data groups.

Next, as shown in FIG. 3, distributed application/distributed data store program communication destination information (hereinafter referred to as communication destination information 226) is information concerning the configurations of the present application and the present data in the distributed application system 109.

The communication destination information 226 is explained.

<Communication Destination Information 226>

Figure 5:
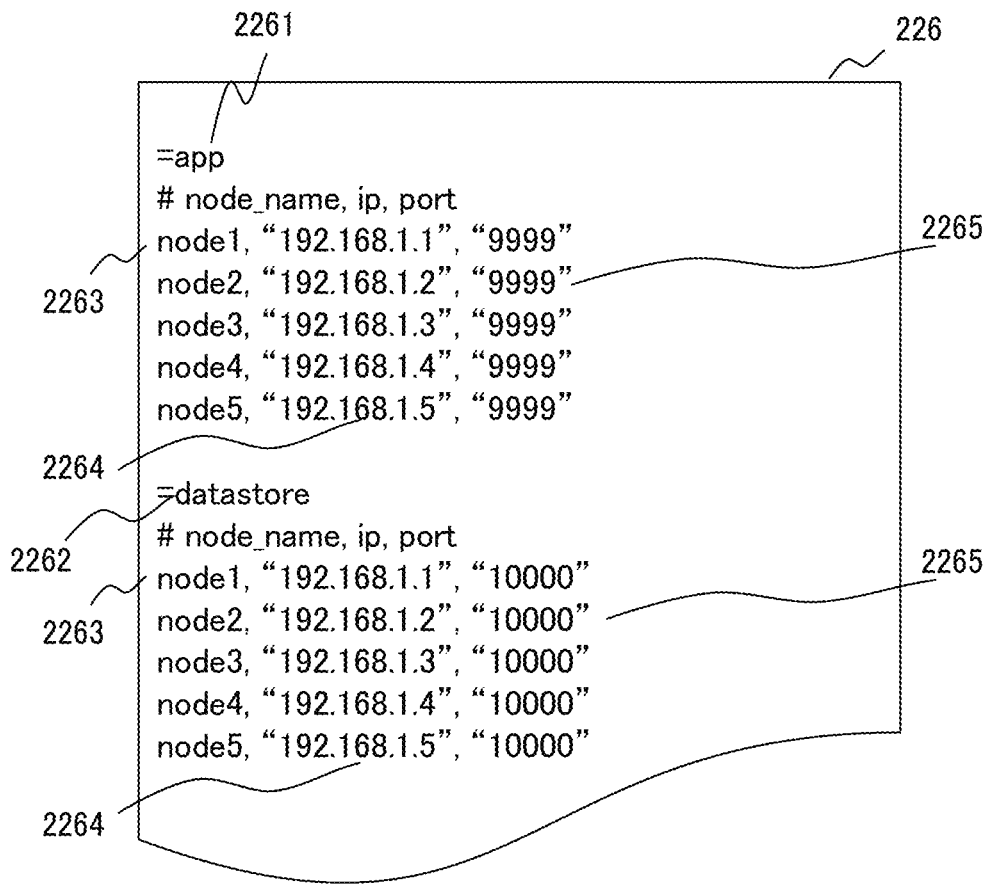
FIG. 5 is a diagram showing an example of communication destination information 226.

FIG. 5 is a diagram showing an example of the communication destination information 226. As shown in the figure, the communication destination information 226 includes respective kinds of information including an identifier (hereinafter referred to as node name 2263) indicating each of a present application 2261 and a present data 2262, an IP address 2264 of the distributed application server 108 in which each of the present application 2261 and the present data 2262 is stored, and a port number 2265 of the distributed application server 108 in which each of the present application 2261 and the present data 2262 is stored. These kinds of communication destination information 226 is used, for example, when the distributed application system monitoring server 106 accesses distributed application configuration information 324 and distributed data store configuration information 325 of the distributed application servers 108.

Subsequently, the configuration of the distributed application server 108 is explained.

<Distributed Application Server 108>

Figure 6:
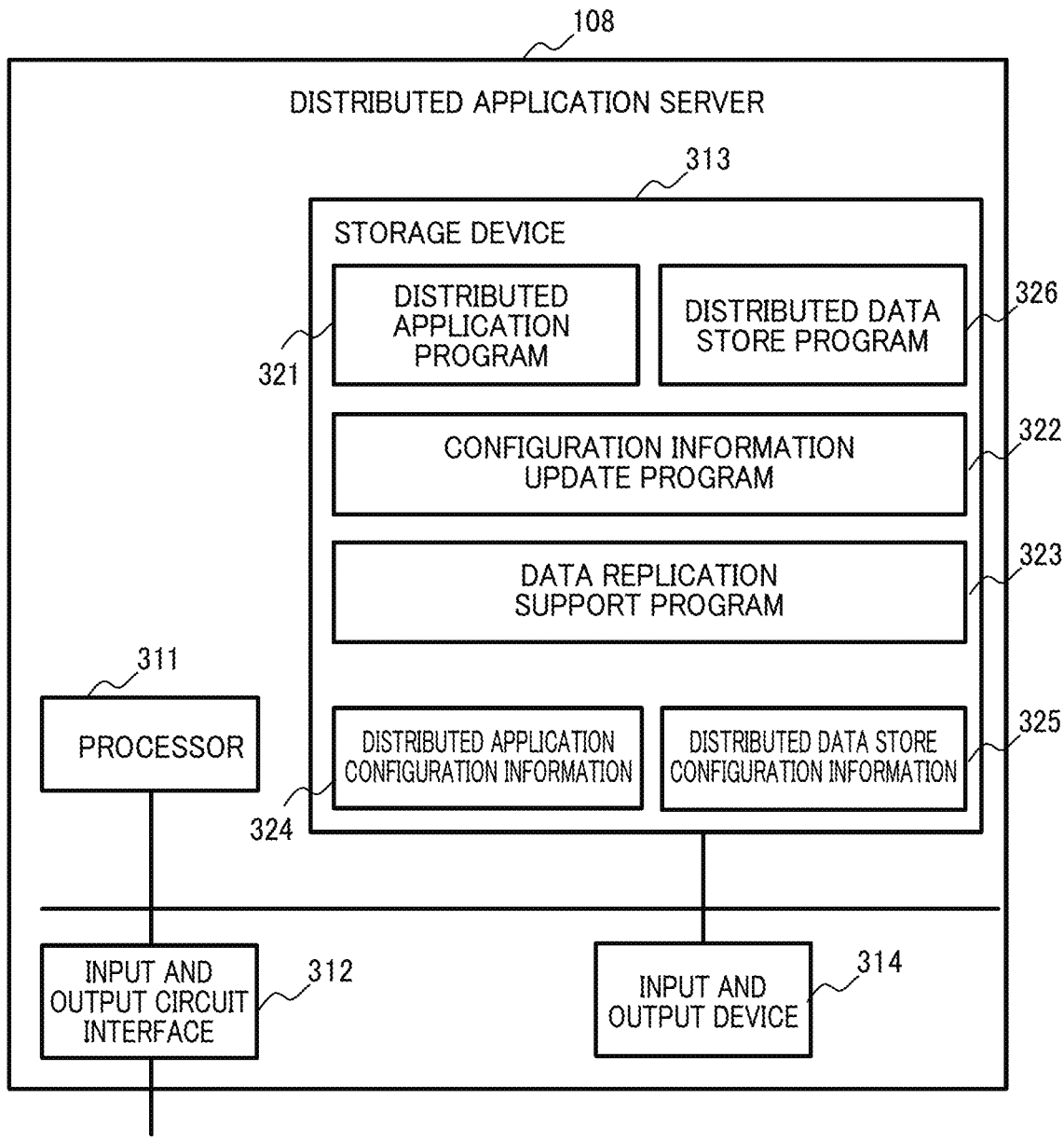
FIG. 6 is a diagram for explaining hardware and functions included in a distributed application server 108.

FIG. 6 is a diagram for explaining hardware and functions included in the distributed application server 108. The distributed application server 108 includes a processor 311 such as a CPU (Central Processing Unit), an input and output circuit interface 312 that performs communication with the other information processing apparatuses, a storage device 313 such as a RAM (Random Access Memory), a ROM (Read Only Memory), a HDD (Hard Disk Drive), or an SSD (Solid State Drive), and an input and output device 314 including a keyboard, a mouse, a touch panel, and a monitor (a display).

The distributed application server 108 has stored, in the storage device 313, programs including a distributed application program 321, a distributed data store program 326, a configuration information update program 322, and a data replication support program 323. The distributed application server 108 has stored, in the storage device 313, distributed application configuration information 324 and distributed data store configuration information 325, which are data corresponding to the configuration information.

The distributed application program 321 is a program of the present application and is a program that the distributed application server 108 executes in parallel with the other distributed application servers 108 or independently.

The distributed data store program 326 is a program for managing the present data. Note that the distributed data store program 326 includes the automatic replication program.

The configuration information update program 322 updates (changes) the distributed application configuration information 324 and the distributed data store configuration information 325 on the basis of a reconfiguration instruction from the distributed application system monitoring server 106.

The data replication support program 323 is a program for executing data replication (synchronous processing of data) on the basis of an instruction from the distributed application system monitoring server 106. Specifically, the data replication support program 323 transfers data to the other distributed application servers 108 or receives transfer of data from the other distributed application servers 108 to thereby perform synchronization of the data. Consequently, the plurality of distributed application servers 108 can perform processing of the present application in Parallel.

The distributed application configuration information 324 is information concerning the configuration of the distributed application program 321. For example, the distributed application configuration information 324 is information concerning a combination of the distributed application programs 321 of the distributed application servers 108 that perform parallel processing.

The distributed data store configuration information 325 includes information for determining an operation state of the distributed application system 109.

<Distributed Data Store Configuration Information 325>

A specific example of the distributed data store configuration information 325 is explained.

Figure 7:
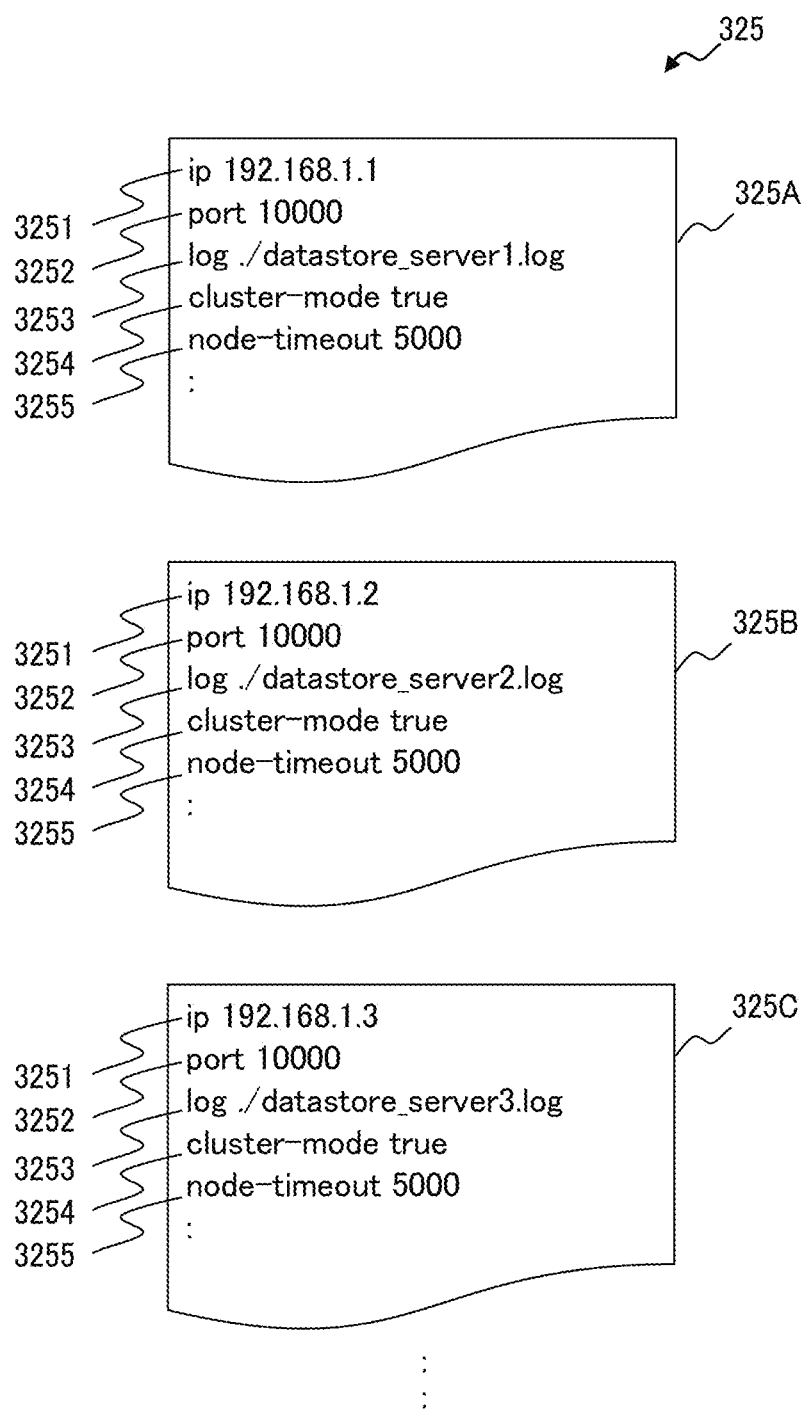
FIG. 7 is a diagram showing an example of distributed data store configuration information 325.

FIG. 7 is a diagram showing an example of the distributed data store configuration information 325. As shown in the figure, the distributed data store configuration information 325 includes an IP address 3251 of the distributed application server 108, a port number 3252 of the distributed application server 108, information 3253 of a log concerning an operation state of the distributed application server 108, cluster mode information 3254 indicating whether the present application in the distributed application server 108 is executed in a cluster mode (whether the present application is executed in parallel by the plurality of distributed application servers 108), and timeout information 3255 concerning a timeout time. The distributed data store configuration information 325 is different for each of the distributed application servers 108 (325A, 325B, 325C, . . . ).

The programs of the distributed application system monitoring server 106 and the distributed application server 108 explained above are executed by hardware of the servers or by being read out by processors of the servers.

These programs are stored in, for example, a computer-readable non-transitory data storage medium such as a storage device such as a secondary storage device, a non-volatile semiconductor memory, a hard disk drive, or an SSD, an IC card, an SD card, or a DVD.

«Processing»

Subsequently, processing performed by the distributed processing management system 100 is explained. As explained below, the distributed processing management system in this embodiment can continue processing of the present application even when the distributed processing system of the ACT/ACT configuration cannot be maintained. When the distributed processing system of the ACT/ACT configuration is temporarily released, the distributed processing management system 100 can recover the distributed processing system.

Figure 8:
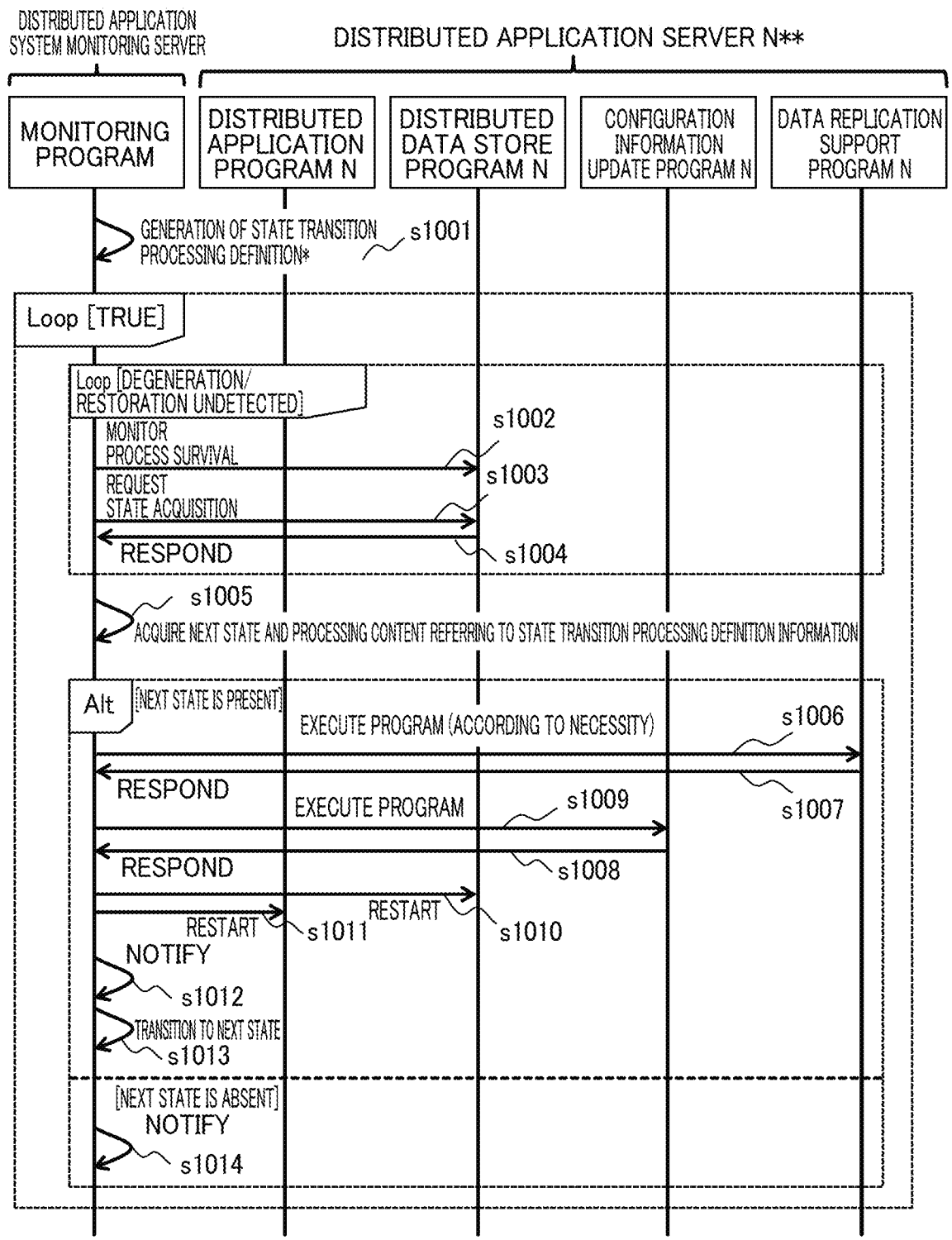
FIG. 8 is a sequence chart showing an example of processing performed by the distributed processing management system 100.
Figure 9:
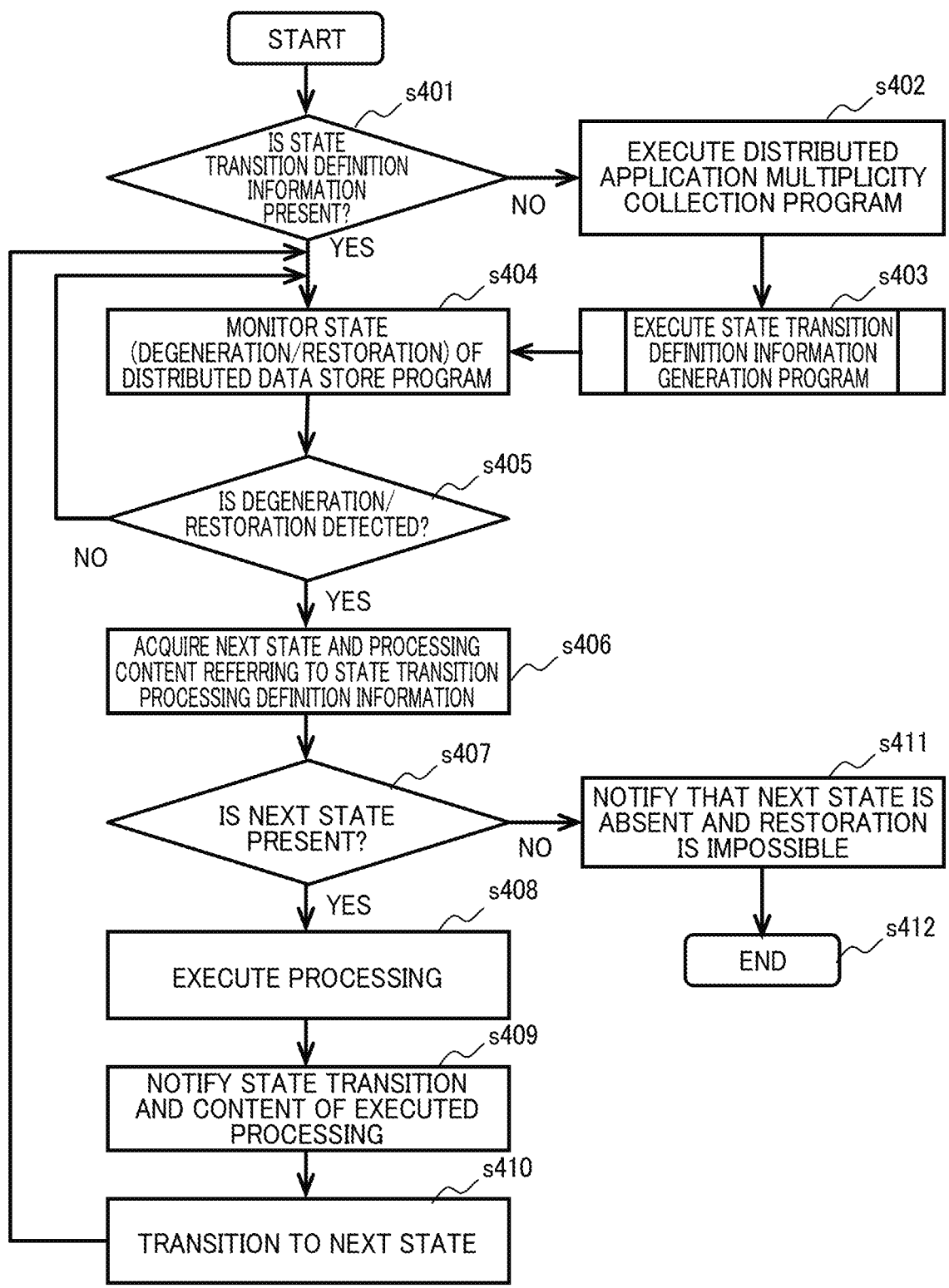
FIG. 9 is a flowchart for explaining an example of processing performed by the distributed application system monitoring server 106.

FIG. 8 is a sequence chart showing an example of processing performed by the distributed processing management system 100. FIG. 9 is a flowchart for explaining an example of processing performed by the distributed application system monitoring server 106. The processing performed by the distributed processing management system 100 (hereinafter referred to as distributed processing system management processing) is explained with reference to these figures. Note that this processing is started, for example, when the distributed processing management system 100 starts.

As shown in FIG. 8, first, the distributed application system monitoring server 106 generates the state transition processing definition information 224 (s1001).

Specifically, as shown in FIG. 9, the monitoring program 221 of the distributed application system monitoring server 106 confirms whether the state transition processing definition information 224 is generated (s401). When the state transition processing definition information 224 is generated (s401: YES), the processing proceeds to s404 explained below. When the state transition processing definition information 224 is not generated yet (NO in s401), the processing proceeds to s402.

In s402, the monitoring program 221 executes the distributed data store multiplicity collection program 223. Then, the distributed data store multiplicity collection program 223 generates the system configuration information 225 and stores the system configuration information 225.

Specifically, for example, the distributed data store multiplicity collection program 223 acquires the information (for example, the distributed application configuration information 324 and the distributed data store configuration information 325) stored by the distributed application servers 108 or monitors presence or absence of data transmitted and received by the distributed application servers 108 to thereby generate the system configuration information 225.

Subsequently, the monitoring program 221 executes the state transition processing definition information generation program 222 on the basis of the system configuration information 225 generated in s402 (s403). Thereafter, the processing proceeds to processing s404 explained below.

Subsequently, as shown in FIG. 8, after the generation of the state transition processing definition information 224, the monitoring program 221 of the distributed application system monitoring server 106 monitors operation states of the distributed application servers 108 in the distributed application system 109 (s1002, s1003, and s1004). Specifically, for example, the monitoring program 221 monitors predetermined data transmitted from the distributed data store programs 326 of the distributed application servers 108 (s1001). When detecting the predetermined data, the monitoring program 221 acquires content of configuration information (the distributed data store configuration information 325) of the distributed application servers 108 that transmit the predetermined data (s1003 and s1004).

That is, as shown in FIG. 9, the monitoring program 221 of the distributed application system monitoring server 106 monitors states (the distributed data store configuration information 325) of the distributed data store programs 326 in the distributed application servers 108 (s404) to thereby detect degeneration or restoration in the distributed application system 109 (s405).

Subsequently, as shown in FIG. 8, as a result of the monitoring of the operation states, when detecting that the operation states change, the monitoring program 221 of the distributed application system monitoring server 106 acquires, referring to the state transition processing definition information 224, a state to which the distributed application system 109 should transition and content of processing for transitioning to the state (s1005).

That is, as shown in FIG. 9, the monitoring program 221 of the distributed application system monitoring server 106 acquires the state transition processing definition information 224 and compares the acquired state transition processing definition information 224 with the distributed data store configuration information 325 indicating the present state of the distributed application system 109 monitored in s405 to acquire the next state of the present state of the distributed application system 109 in the state transition processing definition information 224 (hereinafter referred to as next state) and processing for transitioning to the next state (hereinafter referred to as next processing) (s406).

As shown in FIG. 8, when determining that the next state is present, the monitoring program 221 of the distributed application system monitoring server 106 instructs content of the next processing (transmits a reconfiguration instruction) to the distributed application servers 108. For example, the monitoring program 221 instructs, according to necessity, the distributed application servers 108 to execute a data replication support program (s1006 and s1007), instructs the configuration information update programs 322 of the distributed application servers 108 to change the configuration information (s1008 and s1009), instructs the distributed data store programs 326 of the distributed application servers 108 to restart the distributed application servers 108 (s1010), and instructs the distributed application programs 321 of the distributed application servers 108 to restart the distributed application servers 108 (s1011). On the other hand, when the next state is absent, the monitoring program 221 outputs an indication that the next state or the next processing is absent. The processing ends (s1014).

That is, as shown in FIG. 9, the monitoring program 221 of the distributed application system monitoring server 106 determines whether the next state is present (s407). When the next state is absent (s407: NO), the monitoring program 221 outputs an indication that the next state is absent and restoration of the distributed application system 109 is impossible (for example, outputs the indication to a predetermined log file of the distributed application system monitoring server 106 or a predetermined output apparatus) and ends the processing (s411 and s412). On the other hand, when the next state is present (s407: YES), the monitoring program 221 instructs the next processing to the distributed application servers 108 (s408).

Subsequently, as shown in FIG. 8, the monitoring program 221 of the distributed application system monitoring server 106 outputs an indication that the next processing is executed and content of the next processing (s1012). Thereafter, the processing returns to s1002 (s1013).

That is, as shown in FIG. 9, for example, the monitoring program 221 of the distributed application system monitoring server 106 instructs the next processing to the distributed application servers 108 and thereafter outputs an indication that the next processing is performed and content of the next processing to the predetermined log file or the output apparatus (s409). Thereafter, the processing returns to s404. In this way, the distributed application system monitoring server 106 outputs an indication that the configuration information is changed and content of the change. Therefore, an administrator or the like of the distributed processing management system 100 can grasp an operation state of the distributed processing system as appropriate.

<State Transition Processing Definition Information Generation Program 222>

The state transition processing definition information Generation program 222 for generating the state transition processing definition information 224 explained in s1001 and s403 is explained.

Figure 10:
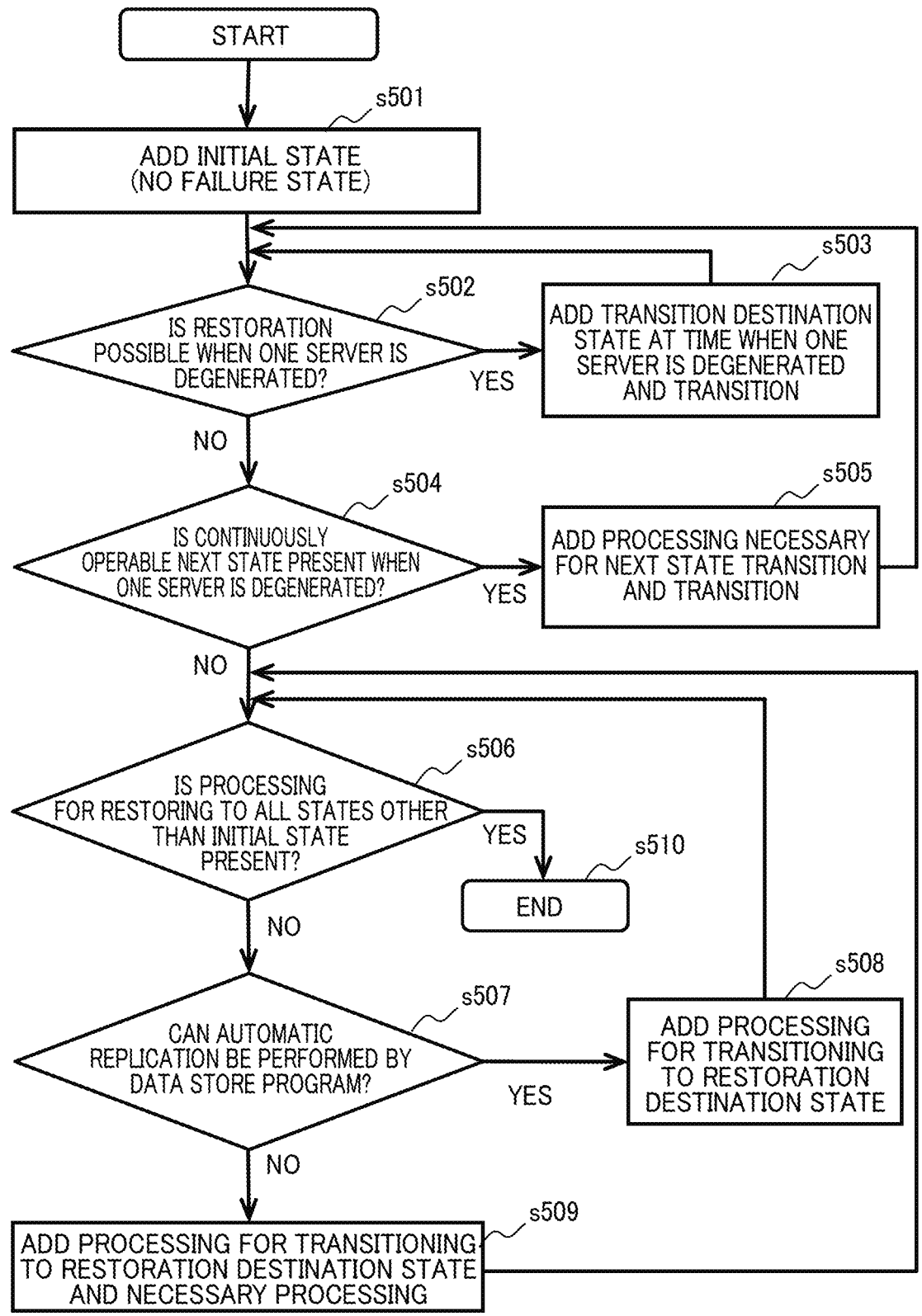
FIG. 10 is a flowchart showing an example of processing performed by a state transition processing definition information generation program 222.

FIG. 10 is a flowchart showing an example of processing performed by the state transition processing definition information generation program 222. As shown in the figure, first, the state transition processing definition information generation program 222 registers an initial state of the distributed application system 109 (s501). Specifically, the state transition processing definition information generation program 222 stores, in the state transition processing definition information 224, as the initial state, the present number of the distributed application servers 108 in the distributed application system 109, the present multiplicity in the distributed application system 109, and the present combination of the distributed application servers 108 in the distributed application system 109. Note that the state transition processing definition information generation program 222 stores the initial state as a state during the processing.

Subsequently, when one distributed application server 108 stops operating (that is, one distributed application server 108 is degenerated) in the distributed application system 109, the state transition processing definition information generation program 222 determines whether the number of the distributed application servers 108 in operation is equal to or larger than a number more than half of multiplicity (equal to or larger than a necessary number) (s502).

When the number of the distributed application servers 108 in operation is equal to or larger than the number more than half of the multiplicity (equal to or larger than the necessary number) (s502: YES), the state transition processing definition information generation program 222 adds the degenerated state to the state transition definition state information (s503). Note that the state transition processing definition information generation program 222 stores the degenerated state as the state during the processing. Thereafter, the processing in s502 is repeated.

On the other hand, when the number of distributed application servers 108 in operation is smaller than the number more than half of the multiplicity (smaller than the necessary number) (s502: NO), the state transition processing definition information generation program 222 confirms that the distributed application servers 108 in operation (capable of executing the present application) are present (s504).

When the distributed application servers 108 in operation are present (s504: YES), the state transition processing definition information generation program 222 adds processing for updating the distributed data store configuration information 325 (update for degeneration) to the state transition processing definition information 224 and stores, as the state during the processing, a state of the distributed application system 109 after the processing is performed (s505). Note that, thereafter, the processing of s502 is repeated.

Specifically, for example, when the number of the distributed application servers 108 in operation is one, the state transition processing definition information generation program 222 changes the distributed data store configuration information 325 to information concerning a configuration in which the one distributed application server 108 in operation independently executes the present application, generates information indicating that processing for changing the multiplicity of the distributed application system 109 to 1 (redundancy degree changing processing), and adds the Generated information to the state transition processing definition information 224.

For example, when the number of the distributed application servers 108 in operation is two or more, the state transition processing definition information generation program 222 generates information indicating processing (configuration changing processing) for changing the distributed data store configuration information 325 to a configuration in which the distributed application servers 108 perform processing of the present application in parallel and adds the generated information to the state transition processing definition information 224. Note that, in this case, when the distributed application server 108 that stops operating is a master, the state transition processing definition information generation program 222 may generate information indicating processing for transferring data stored in the slave in operation distributed application servers 108 to the another distributed application server 108 and setting the distributed application server 108 at the transfer destination as a master and add the generated information to the state transition processing definition information 224.

On the other hand, when the distributed application servers 108 in operation (capable of executing the present application) are absent (s504: NO), the state transition processing definition information generation program 222 determines whether, among all states (excluding the initial state) added to the state transition processing definition information 224 so far, there are states in which processing (restoration processing) for changing the states to a state in which the plurality of distributed application servers 108 perform application processing in parallel because one or more distributed application servers 108 not in operation start operation is not added (hereinafter referred to as restorable states) (s506).

When the restoration processing is added in all the states (s506: YES), the processing ends (s510). However, when there is a state in which the restoration processing is not added (s506: NO), the state transition processing definition information generation program 222 selects one of the restorable states and then determines whether the restoration processing from the restorable state is possible by the automatic replication program in the distributed application server 108 (s507).

When the restoration processing is possible by the automatic replication program (s507: YES), the state transition processing definition information generation program 222 adds information indicating execution of the automatic replication program functioning as the restoration processing to the state transition processing definition information (s508). Thereafter, the processing in s506 is repeated.

On the other hand, when the restoration processing by the automatic replication program is not possible (s507: NO), the state transition processing definition information generation program 222 adds restoration processing not by the automatic replication program to the state transition processing definition information 224 and stores a state of the distributed application system 109 after the restoration processing is performed as the state during the processing (s508). Thereafter, the processing in s506 is repeated.

Specifically, for example, the state transition processing definition information generation program 222 generates information indicating, as restoration processing performed when the number of the distributed application servers 108 operating in the distributed application system 109 is equal to or larger than the number more than half of the multiplicity (equal to or more than the necessary number) because one or two or more distributed application servers 108 start operation from a state in which the redundancy degree changing processing is executed, processing for changing the configuration of the distributed application system 109 to a configuration in which a plurality of distributed application servers 108 including the distributed application servers 108 that start operation execute the present application and returning the multiplicity of the distributed application system 109 to the multiplicity before the execution (redundancy degree recovery processing) and adds the generated information to the state transition processing definition information 224.

For example, the state transition processing definition information generation program 222 generates information indicating, as restoration processing performed when one distributed application server 108 starts operation from the state in which the configuration chance processing is executed, processing for chancing the configuration of the distributed application system 109 to a configuration in which a plurality of distributed application servers 108 including the distributed application server 108 that starts operation execute the present application in parallel (configuration recovery processing) and adds the generated information to the state transition processing definition information 224.

<State Transition Processing Definition Information 224>

A specific example of the state transition processing definition information 224 generated by the state transition processing definition information generation program 222 is explained.

(State Transition Processing Definition Information 224 in the Case 1)

FIG. 11 is a flowchart for explaining an example of the state transition processing definition information 224 in the case 1. As shown in the figure, when a state of the distributed application system 109 transitions from a state (s601) in which three distributed application servers 108 among the three distributed application servers 108 configuring the distributed application system 109 are operating to a state (s602) in which two distributed application servers 108 are operating because one distributed application server 108 stops operating (that is, degeneration of one distributed application server 108 occurs), the state of the distributed application system 109 transitions (returns) to the state of s601 according to the automatic data replication program when one distributed application server 108 not in operation starts operation (is restored).

On the other hand, when the state of the distributed application system 109 transitions from the state of s602 to a state (s603) in which one distributed application server 108 of the two distributed application servers 108 in operation further stops operating, the two distributed application servers 108 not in operation are excluded (cut off) from the distributed application system 109 and one distributed application server 108 operating in the distributed application system 109 independently performs the processing of the present application (s607, s608, and s605). Specifically, for example, the distributed application configuration information 324 and the distributed data store configuration information 325 are updated to information concerning a configuration in which the one distributed application server 108 in operation independently performs application processing (at multiplicity of 1) according to a reconfiguration instruction from the distributed application system monitoring server 106 (s607) and the distributed application system 109 is restarted (s608). Consequently, the state of the distributed application system 109 transitions to a state in which the one distributed application server 108 executes the processing of the present application (s605).

When, in s605, since at least one of the distributed application servers 108 not in operation starts operation, the state of the distributed application system 109 transitions to a state in which the plurality of distributed application servers 108 are operating, the distributed application server 108 that starts operation is incorporated in the distributed application system 109 and the plurality of distributed application servers 108 in the distributed application system 109 perform the processing of the present application in parallel (s611, s610, and s609). Specifically, for example, first, the data replication support program is executed, whereby data of the distributed application servers 108 already in operation is transferred to the distributed application server 108 that starts operation and data of the distributed application servers 108 in operation are synchronized (s611). The distributed application configuration information 324 and the distributed data store configuration information 325 are updated to information concerning a configuration in which the distributed application servers 108 already in operation and the distributed application server 108 that starts operation perform the processing of the present application in parallel (at multiplicity of 3) according to a reconfiguration instruction from the distributed application system monitoring server 106 (s610) and the distributed application system 109 is restarted (s609). Consequently, the state of the distributed application system 109 transitions to a state in which the (two or three) distributed application servers 108 equal to or more than a number more than half of the multiplicity execute the processing of the present application in parallel (s610 and s602). Note that in s611, the data replication support program may perform, according to necessity, reconfiguration of a master and slaves explained below.

When the state of the distributed application system 109 transitions from the state of s603 or s607 to a state in which all the distributed application servers 108 in the distributed application system 109 are not operating, all the distributed application servers 108 in the distributed application system 109 stop the processing of the present application (s604).

When the state of the distributed application system 109 transitions from the state in s608 or s605 to the state in which all the distributed application servers 108 in the distributed application system 109 are not operating, all the distributed application servers 108 in the distributed application system 109 stop the processing of the present application (s606).

Note that FIG. 12 is a diagram showing an example of a data structure of the state transition processing definition information 224 in the case 1. As shown in the figure, the state transition processing definition information 224 includes at least one or more aggregates 6215 of information including items of a state specifying part 6211 indicating a state of the distributed application system 109 (the number of the distributed application servers 108 in operation and multiplicity of the distributed application system 109), a trigger part 6212 indicating content of transition from a state currently indicated by the state specifying part 6211 to another state (for example, one distributed application server 108 is degenerated), a next state part 6213 indicating a state of the distributed application system 109 reached as a result of the transition indicated by the trigger part 6212, and a next processing part 6214 indicating processing performed when the state of the distributed application system 109 transitions to the state indicated by the next state part 56213.

Subsequently, an example of the state transition processing definition information 224 in the case 2 is explained.

(State Transition Processing Definition Information 224 in the Case 2)

Figure 13:
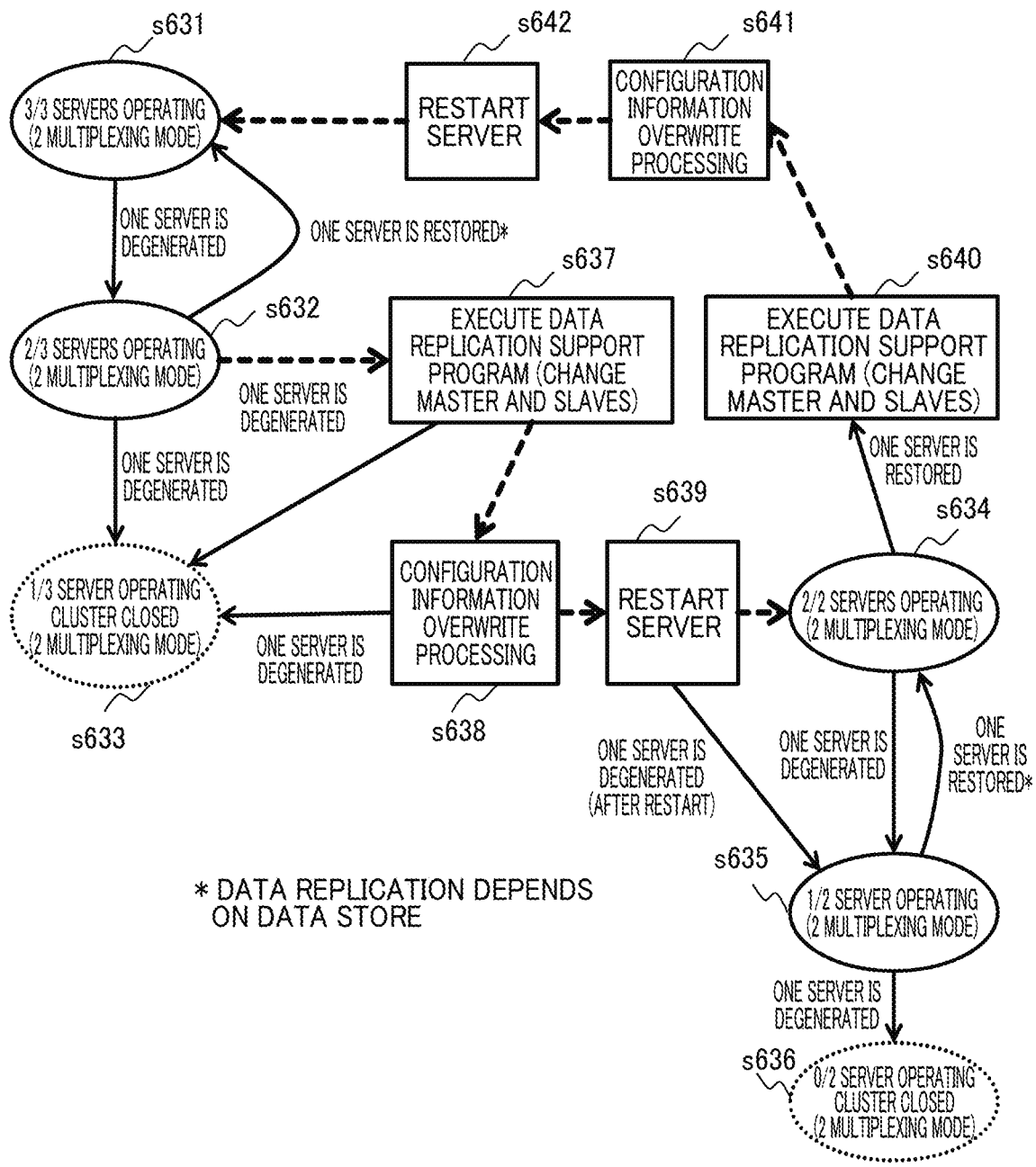
FIG. 13 is a flowchart for explaining an example of the state transition processing definition information 224 in the case 2.

FIG. 13 is a flowchart for explaining an example of the state transition processing definition information 224 in the case 2. As shown in the figure, when the state of the distributed application system 109 transitions from a state (s631) in which three distributed application servers 108 among the three distributed application servers 108 configuring the distributed application system 109 are operating to a state (s632) in which two distributed application servers 108 are operating because one distributed application server 108 stops operating (that is, degeneration of one distributed application server 108 occurs), the one distributed application server 108 that stops operating is excluded (cut off) from the distributed application system 109 and the two distributed application servers 108 operating in the distributed application system 109 perform the processing of the present application in parallel (s637, s638, s639, and s634). Specifically, for example, the data replication support program 323 is executed according to a reconfiguration instruction from the distributed application system monitoring server 106 and data of the distributed application servers 108 in operation are synchronized (s637). According to a reconfiguration instruction from the distributed application system monitoring server 106, the distributed application configuration information 324 and the distributed data store configuration information 325 are updated to information concerning a configuration in which the distributed application servers 108 in the distributed application system 109, from which the distributed application server 108 that stops operating is cut off, perform the processing of the present application in parallel (s638) and the distributed application system 109 is restarted (s639). Consequently, the state of the distributed application system 109 transitions to a state in which the two distributed application servers 108 perform the processing of the present application in parallel (s634).

Note that, when the distributed application server 108 that stops operating in s632 is a master, both of the two distributed application servers 108 in operation are slaves and the synchronization processing cannot be normally performed. Therefore, for example, in s637, reconfiguration in which the data replication support program sets one of the two slaves in operation as a master and performs the synchronization processing of data between the two slaves may be performed (see a state 201 and a state 202 in FIG. 2).

When one of the distributed application servers 108 starts operation in s634, whereby the state of the distributed application system 109 transitions to a state in which the three distributed application servers 108 are operating, the distributed application server 108 that starts operation is incorporated in the distributed application system 109 and the three-distributed application servers 108 in the distributed application system 109 perform the processing of the present application in parallel (s641, s642, and s631).

Specifically, for example, first, the data replication support program is executed according to a reconfiguration instruction from the distributed application system monitoring server 106, whereby data of the distributed application servers 108 already in operation is transferred to the distributed application server 108 that starts operation and the data is synchronized between these distributed application servers 108 (s640). According to the reconfiguration instruction from the distributed application system monitoring server 106, the distributed application configuration information 324 and the distributed data store configuration information 325 are updated to information concerning a configuration in which the distributed application servers 108 already in operation and the distributed application server 108 that starts operation perform the processing of the present application in parallel (s641) and the distributed application system. 109 is restarted (s642). Consequently, the state of the distributed application system 109 transitions to a state in which the three distributed application servers 108 execute the processing of the present application in parallel (s631).

Note that, when data replication is performed in s640, reconfiguration for setting the distributed application server 108 that starts operation as a master and setting the other distributed application servers 108 in operation as slaves may be performed.

When one of the distributed application servers 108 in operation in the state of s632, s637, or s638 stops operating (that is, one distributed application system 109 is degenerated), the state of the distributed application system 109 transitions to a state in which one distributed application server 108 in operation independently performs the processing of the present application (s633).

When one of the distributed application servers 108 in operation in the state of s639 or s634 stops operating (s635) (that is, one distributed application server 108 is degenerated), the state of the distributed application system 109 transitions (returns) to the state of s634 according to the automatic replication program.

On the other hand, when the state of the distributed application system 109 transitions from the state of s635 to a state in which the one distributed application server 108 in operation stops operating (s636), all the distributed application servers 108 in the distributed application system 109 stop the processing of the present application (s636).

As explained above, the distributed processing management system 100 in this embodiment stores the configuration information (the system configuration information 225) concerning the number and the combination of the information processing apparatuses (the distributed application servers 108) configuring the distributed processing system (the distributed application system 109). When detecting a change of operation states of the information processing apparatuses, the distributed processing management system 100 changes the configuration information on the basis of the number and a combination of the information processing apparatuses in operation and causes at least one or more information processing apparatuses in operation to perform the predetermined processing (the processing of the present application) independently or in parallel. Therefore, even when the operation states of the distributed application servers 108 change and a part of the distributed application servers 108 stops operating or starts operation, the processing of the present application can be continuously performed in parallel or independently. In this way, with the distributed processing management system 100 in this embodiment, by changing the configuration and the redundancy degree of the distributed application system 109 according to the operation states of the distributed application servers 108, the distributed processing management system 100 can perform stable operation of the distributed application system 109 while securing redundancy in the redistributed application system 109.

When a part of the information processing apparatuses (the distributed application system 109) in operation stops operating, the distributed processing management system 100 in this embodiment changes the configuration information (the system configuration information 225) on the basis of the number and a combination of the information processing apparatuses in operation and causes the information processing apparatuses in operation to perform the predetermined processing (the processing of the present application) independently or in parallel. Therefore, even if a part of the distributed application system 109 stops operating, by changing the configuration in the distributed application system 109, the distributed processing management system 100 can surely continue the processing of the present application.

After the degeneration processing is executed, when the information processing apparatus (the distributed application server 108) not in operation starts operation, the distributed processing management system 100 in this embodiment changes the configuration information (the system configuration information 225) on the basis of the number and a combination of the information processing apparatuses in operation and causes a plurality of information processing apparatuses in operation to perform the predetermined processing (the processing of the present application) in parallel. Therefore, even if a redundancy degree temporarily decreases according to the degeneration processing, when the distributed application server 108 not in operation resumes operation, the distributed processing management system 100 can reduce the parallel processing of the present application and recover the redundancy degree.

In a state in which the information processing apparatuses less than the number indicated by the configuration information are operating because a part of the information processing apparatuses (the distributed application servers 108) indicated by the configuration information (the system configuration information 225) stops operating, the distributed processing management system 100 in this embodiment changes the number and the combination in the configuration information to a new number and a new combination of the information processing apparatuses in operation from which the information processing apparatus that stops operating is excluded and causes the information processing apparatuses in operation to perform the predetermined processing (the processing of the present application) (the redundancy degree changing processing). Therefore, the distributed processing management system 100 can temporarily cut off the distributed application server 108 that stops operating from the distributed application system 109 and surely perform the processing of the present application using the other distributed application servers 108.

For example, after the redundancy degree changing processing is executed, when the information processing apparatus (the distributed application server 108) not in operation starts operation, the distributed processing management system 100 in this embodiment chances the number and the combination in the configuration information (the system configuration information 225) to a new number and a new combination of the information processing apparatuses including the information processing apparatus that starts operation and causes a plurality of information processing apparatuses in operation to perform the predetermined processing (the processing of the present application) in parallel (the redundancy degree recovery processing). Therefore, by incorporating the distributed application server 108 cut off from the distributed application system 109 by the redundancy degree changing processing into the distributed application system 109 again, the distributed processing management system 100 can surely reduce the parallel processing of the present application.

For example, in a state in which a part of the information processing apparatuses (the distributed application servers 108) indicated by the configuration information (the system configuration information 225) stops operating but a plurality of information processing apparatuses equal to or more than the necessary number indicated by the configuration information are still operating, the distributed processing management system 100 in this embodiment changes the combination in the configuration information to a new combination of the information processing apparatuses excluding the information processing apparatus that stops operating and causes the information processing apparatuses in operation to perform the predetermined processing (the processing of the present application) in parallel (the configuration changing processing). Therefore, even when a part of the information processing apparatuses (the distributed application servers 108) stops operating, the distributed processing management system 100 can continue the parallel processing of the present application with the distributed application servers 108 in operation in the distributed application system 109.

After the configuration changing processing is executed, when the information processing apparatus (the distributed application server 108) not in operation starts operation, the distributed processing management system 100 in this embodiment changes the combination in the configuration information (the system configuration information 225) to a new combination of the information processing apparatuses including the information processing apparatus that starts operation and causes the information processing apparatuses in operation to perform the predetermined processing (the processing of the present application) in parallel (the configuration recovery processing). Therefore, even if a part of the distributed application servers 108 stops operating, the distributed processing management system 100 can perform the parallel processing of the present application in a state in which the configuration of the distributed application system 109 is returned to the configuration before the execution of the configuration changing processing.

Further, in the distributed processing management system 100 in this embodiment, the configuration information (the system configuration information 225) includes the combination of the master and the slaves. When the information processing apparatus (the distributed application server 108) that stops operating is the master, the distributed processing management system 100 performs, on the configuration information, a change for setting any one of the slaves in operation as a new master to thereby cause the information processing apparatuses in operation to perform the processing of the present application in parallel. Therefore, the distributed processing management system 100 can secure synchronism in the parallel processing of the present application in the distributed application system 109.

As it is seen from the above, when the distributed processing system of the ACT/ACT configuration in which the distributed application system 109 requires the predetermined necessary number of the information processing apparatuses (the distributed application servers 108) is assumed, even if a part of the information processing apparatuses stops operating and the number of the information processing apparatuses become smaller than the necessary number, the distributed processing management system 100 can continue the processing of the present application with a new configuration and a new number of the information processing apparatuses of the distributed application system 109 in which the ACT/ACT configuration is temporarily changed. When the distributed application server 108 not in operation starts operation, the distributed processing management system 100 can recover the ACT/ACT configuration again. On the other hand, even if a part of the distributed application servers 108 stops operating, when the number of the distributed application servers 108 is not smaller than the necessary number, the distributed application system 109 can continue the processing of the present application with a function (for example, the automatic replication program) peculiar to the distributed processing system of the ACT/ACT configuration. In this way, with the distributed processing management system 100 in this embodiment, it is possible to always perform stable and flexible operation of the distributed processing system irrespective of the necessary number (for example, a number equal to or larger than a number more than half) of the distributed application servers 108 in the distributed processing system of the ACT/ACT configuration. Consequently, it is possible to greatly reduce a downtime (a processing time) in a configuration chance of the distributed application system 109. It is possible to secure synchronism of processing in the distributed application system 109 and avoid occurrence of a split brain that is likely to spoil consistency of the processing.

The above explanation of the embodiment is explanation for facilitating understanding of the present invention and does not limit the present invention. The present invention can be changed and improved without departing from the gist of the present invention. Equivalents of the present invention are included in the present invention.

REFERENCE SIGNS LIST

100 distributed processing management system
106 distributed application system monitoring server
108 distributed application server
109 distributed application system
51 configuration-information storing part
52 state monitoring part
53 system reconfiguring part

The invention claimed is:
1. A distributed processing system that is configured to include a plurality of information processing apparatuses communicably coupled to one another and each including a processor and a memory and is capable of performing parallel processing in which the information processing apparatus performs predetermined processing in parallel with the other information processing apparatuses, the distributed processing system comprising:
- a configuration-information storing part that stores configuration information, which is information concerning a number of the information processing apparatuses configuring the distributed processing system and a combination of the information processing apparatuses;
- a state monitoring part that monitors an operation state of each of the information processing apparatuses; and
- a system reconfiguring part that, when detecting a change of the operation state of the information processing apparatus, changes the configuration information on the basis of a number and a combination of the information processing apparatuses in operation and causes, on the basis of the changed configuration information, at least one or more of the information processing apparatuses in operation to perform the predetermined processing independently or in parallel,
- wherein the system reconfiguring part includes a degenerating part that performs degeneration processing for, when detecting that a part of the information processing apparatuses in operation stops operating, changing the configuration information on the basis of the number and the configuration of the information processing apparatuses in operation and causing, on the basis of the changed configuration information, the information processing apparatuses in operation to perform the predetermined processing independently or in parallel, and
- wherein the degenerating part includes a redundancy-degree changing part that performs redundancy degree changing processing for, when detecting a state in which the information processing apparatuses less than a number indicated by the configuration information are operating because a part of the information processing apparatuses indicated by the configuration information stops operating, changing the number and the combination in the configuration information to a new number and a new combination of the information processing apparatuses in operation from which the information processing apparatus that stops operating is excluded and causing, on the basis of the changed configuration information, the information processing apparatuses in operation to perform the predetermined processing.

2. The distributed processing system according to claim 1, wherein the system reconfiguring part includes a restoring part that performs restoration processing for, after the degeneration processing is executed, when detecting that the information processing apparatus not in operation starts operation, changing the configuration information on the basis of the number and the combination of the information processing apparatuses in operation and causing, on the basis of the changed configuration information, a plurality of the information processing apparatuses in operation to perform the predetermined processing in parallel.

3. The distributed processing system according to claim 1, wherein the restoring part includes a redundancy-degree recovering part that performs redundancy degree recovery processing for, after the redundancy degree changing processing is executed, when detecting that the information processing apparatus not in operation starts operation, changing the number and the combination in the configuration information to a new number and a new combination of the information processing apparatuses including the information processing apparatus that starts operation and causing, on the basis of the changed configuration information, a plurality of the information processing apparatuses in operation to perform the predetermined processing in parallel.

4. The distributed processing system according to claim 1, wherein the degenerating part includes a configuration changing part that performs configuration changing processing for, when detecting a state in which a part of the information processing apparatuses indicated by the configuration information stops operating but a plurality of the information processing apparatuses equal to or more than the number indicated by the configuration information are still operating, changing the combination in the configuration information to a new combination of the information processing apparatuses from which the information processing apparatus that stops operating is excluded and causing, on the basis of the changed configuration information, the information processing apparatuses in operation to perform the predetermined processing in parallel.

5. The distributed processing system according to claim 4, wherein the restoring part includes a configuration recovering part that performs configuration recovery processing for, after the configuration changing processing is executed, when detecting that the information processing apparatus not in operation starts operation, changing the combination in the configuration information to a new combination of the information processing apparatuses including the information processing apparatus that starts operation and causing, on the basis of the changed configuration information, the information processing apparatuses in operation to perform the predetermined processing in parallel.

6. The distributed processing system according to claim 4, wherein
- the configuration information includes a combination of a master, which is the information processing apparatus that controls the predetermined processing performed in parallel, and slaves, which are the information processing apparatuses, processing of which is controlled by the master, and
- when the information processing apparatus that stops operating is the master, the configuration changing part performs, on the configuration information, a change for setting any one of the slaves in operation as a new master to thereby cause the information processing apparatuses in operation to perform the predetermined processing in parallel.

7. The distributed processing system according to claim 1, further comprising a reconfiguration notifying part that outputs an indication that the configuration information is changed or content of the change.

8. The distributed processing system according to claim 1, further comprising a reconfiguration notifying part that outputs an indication that the configuration information is changed or content of the change, wherein
the system reconfiguring part includes:
- a degenerating part that performs degeneration processing for, when detecting that a part of the information processing apparatuses in operation stops operating, changing the configuration information on the basis of the number and the configuration of the information processing apparatuses in operation and causing, on the basis of the changed configuration information, the information processing apparatuses in operation to perform the predetermined processing independently or in parallel; and a restoring part that performs restoration processing for, after the degeneration processing is executed, when detecting that the information processing apparatus not in operation starts operation, changing the configuration information on the basis of the number and the combination of the information processing apparatuses in operation and causing, on the basis of the changed configuration information, a plurality of the information processing apparatuses in operation to perform the predetermined processing in parallel, the degenerating part includes a redundancy-degree changing part that performs redundancy degree changing processing for, when detecting a state in which the information processing apparatuses less than a number indicated by the configuration information are operating because a part of the information processing apparatuses indicated by the configuration information stops operating, changing the number and the combination in the configuration information to a new number and a new combination of the information processing apparatuses in operation from which the information processing apparatus that stops operating is excluded and causing, on the basis of the changed configuration information, the information processing apparatuses in operation to perform the predetermined processing, the restoring part includes a redundancy-degree recovering part that performs redundancy degree recovery processing for, after the redundancy degree changing processing is executed, when detecting that the information processing apparatus not in operation starts operation, changing the number and the combination in the configuration information to a new number and a new combination of the information processing apparatuses including the information processing apparatus that starts operation and causing, on the basis of the changed configuration information, a plurality of the information processing apparatuses in operation to perform the predetermined processing in parallel, the degenerating part includes a configuration changing part that performs configuration changing processing for, when detecting a state in which a part of the information processing apparatuses indicated by the configuration information stops operating but a plurality of the information processing apparatuses equal to or more than the number indicated by the configuration information are still operating, changing the combination in the configuration information to a new combination of the information processing apparatuses from which the information processing apparatus that stops operating is excluded and causing, on the basis of the changed configuration information, the information processing apparatuses in operation to perform the predetermined processing in parallel, the restoring part includes a configuration recovering part that performs configuration recovery processing for, after the configuration changing processing is executed, when detecting that the information processing apparatus not in operation starts operation, changing the combination in the configuration information to a new combination of the information processing apparatuses including the information processing apparatus that starts operation and causing, on the basis of the changed configuration information, the information processing apparatuses in operation to perform the predetermined processing in parallel, the configuration information includes a combination of a master, which is the information processing apparatus that controls the predetermined processing performed in parallel, and slaves, which are the information processing apparatuses, processing of which is controlled by the master, and when the information processing apparatus that stops operating is the master, the configuration changing part performs, on the configuration information, a change for setting any one of the slaves in operation as a new master to thereby cause the information processing apparatuses in operation to perform the predetermined processing in parallel.

9. A method for management of a distributed processing system in a distributed processing system that is configured to include a plurality of information processing apparatuses communicably coupled to one another and each including a processor and a memory and is capable of performing parallel processing in which the information processing apparatus performs predetermined processing in parallel with the other information processing apparatuses, the information processing apparatus including the processor and the memory executing:

configuration-information storing processing for storing configuration information, which is information concerning a number of the information processing apparatuses configuring the distributed processing system and a combination of the information processing apparatuses;

state monitoring processing for monitoring an operation state of each of the information processing apparatuses; and system reconfiguration processing for, when detecting a change of the operation state of the information processing apparatus, changing the configuration information on the basis of a number and a combination of the information processing apparatuses in operation and causing, on the basis of the changed configuration information, at least one or more of the information processing apparatuses in operation to perform the predetermined processing independently or in parallel, wherein, in the system reconfiguration processing, the information processing apparatus executes degeneration processing for, when detecting that a part of the information processing apparatuses in operation stops operating, changing the configuration information on the basis of the number and the configuration of the information processing apparatuses in operation and causing, on the basis of the changed configuration information, the information processing apparatuses in operation to perform the predetermined processing independently or in parallel, and wherein, in the degeneration processing, the information processing apparatus executes redundancy degree changing processing for, when detecting a state in which the information processing apparatuses less than a number indicated by the configuration information are operating because a part of the information processing apparatuses indicated by the configuration information stops operating, changing the number and the combination in the configuration information to a new number and a new combination of the information processing apparatuses in operation from which the information processing apparatus that stops operating is excluded and causing, on the basis of the changed configuration information, the information processing apparatuses in operation to perform the predetermined processing.

10. The method for management of the distributed processing system according to claim 9, wherein, in the system reconfiguration processing, the information processing apparatus executes restoration processing for, after the degeneration processing is executed, when detecting that the information processing apparatus not in operation starts operation, changing the configuration information on the basis of the number and the combination of the information processing apparatuses in operation and causing, on the basis of the changed configuration information, a plurality of the information processing apparatuses in operation to perform the predetermined processing in parallel.

11. The method for management of the distributed processing system according to claim 9, wherein, in the restoration processing, the information processing apparatus executes redundancy degree recovery processing for, after the redundancy degree changing processing is executed, when detecting that the information processing apparatus not in operation starts operation, changing the number and the combination in the configuration information to a new number and a new combination of the information processing apparatuses including the information processing apparatus that starts operation and causing, on the basis of the changed configuration information, a plurality of the information processing apparatuses in operation to perform the predetermined processing in parallel.

12. A distributed processing system that is configured to include a plurality of information processing apparatuses communicably coupled to one another and each including a processor and a memory and is capable of performing parallel processing in which the information processing apparatus performs predetermined processing in parallel with the other information processing apparatuses, the distributed processing system comprising:
 a configuration-information storing part that stores configuration information, which is information concerning a number of the information processing apparatuses configuring the distributed processing system and a combination of the information processing apparatuses;
 a state monitoring part that monitors an operation state of each of the information processing apparatuses; and
 a system reconfiguring part that, when detecting a change of the operation state of the information processing apparatus, changes the configuration information on the basis of a number and a combination of the information processing apparatuses in operation and causes, on the basis of the changed configuration information, at least one or more of the information processing apparatuses in operation to perform the predetermined processing independently or in parallel,
 wherein the system reconfiguring part includes a degenerating part that performs degeneration processing for, when detecting that a part of the information processing apparatuses in operation stops operating, changing the configuration information on the basis of the number and the configuration of the information processing apparatuses in operation and causing, on the basis of the changed configuration information, the information processing apparatuses in operation to perform the predetermined processing independently or in parallel, and
 wherein the degenerating part includes a configuration changing part that performs configuration changing processing for, when detecting a state in which a part of the information processing apparatuses indicated by the configuration information stops operating but a plurality of the information processing apparatuses equal to or more than the number indicated by the configuration information are still operating, changing the combination in the configuration information to a new combination of the information processing apparatuses from which the information processing apparatus that stops operating is excluded and causing, on the basis of the changed configuration information, the information processing apparatuses in operation to perform the predetermined processing in parallel.

13. The distributed processing system according to claim 12, wherein the restoring part includes a configuration recovering part that performs configuration recovery processing for, after the configuration changing processing is executed, when detecting that the information processing apparatus not in operation starts operation, changing the combination in the configuration information to a new combination of the information processing apparatuses including the information processing apparatus that starts operation and causing, on the basis of the changed configuration information, the information processing apparatuses in operation to perform the predetermined processing in parallel.

14. The distributed processing system according to claim 12, wherein
 the configuration information includes a combination of a master, which is the information processing apparatus that controls the predetermined processing performed in parallel, and slaves, which are the information processing apparatuses, processing of which is controlled by the master, and
 when the information processing apparatus that stops operating is the master, the configuration changing part performs, on the configuration information, a change for setting any one of the slaves in operation as a new master to thereby cause the information processing apparatuses in operation to perform the predetermined processing in parallel.

* * * * *